United States Patent
Hirose et al.

(10) Patent No.: US 11,436,256 B2
(45) Date of Patent: Sep. 6, 2022

(54) INFORMATION PROCESSING APPARATUS AND INFORMATION PROCESSING SYSTEM

(71) Applicant: FUJITSU LIMITED, Kawasaki (JP)

(72) Inventors: Atsuhito Hirose, Odawara (JP); Tamaki Tanaka, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/118,663

(22) Filed: Dec. 11, 2020

(65) Prior Publication Data

US 2021/0224292 A1 Jul. 22, 2021

(30) Foreign Application Priority Data

Jan. 20, 2020 (JP) .............................. JP2020-006477

(51) Int. Cl.
*G06F 16/27* (2019.01)
*G06F 16/22* (2019.01)
*G06F 9/50* (2006.01)

(52) U.S. Cl.
CPC .......... *G06F 16/275* (2019.01); *G06F 9/5083* (2013.01); *G06F 16/2282* (2019.01)

(58) Field of Classification Search
CPC ............... G06F 9/5083; G06F 11/1469; G06F 11/2094; G06F 16/273; G06F 16/275; G06F 2201/84; G06F 16/21; G06F 16/27; G06F 3/0607; G06F 3/064; G06F 3/065; G06F 3/0683; G06F 16/2365; G06F 16/284; G06F 16/285; G06F 16/2282
See application file for complete search history.

(56) References Cited

U.S. PATENT DOCUMENTS

| | | | |
|---|---|---|---|
| 2017/0371585 A1* | 12/2017 | Lazo | ........................ G06F 3/061 |
| 2020/0110674 A1* | 4/2020 | Kim | ..................... G06F 16/2358 |
| 2021/0081246 A1* | 3/2021 | Rajadurai | ........... G06F 11/1451 |

FOREIGN PATENT DOCUMENTS

| | | |
|---|---|---|
| JP | 2001-188658 A | 7/2001 |
| WO | 2018/127948 A1 | 7/2018 |

* cited by examiner

*Primary Examiner* — Marcin R Filipczyk
(74) *Attorney, Agent, or Firm* — Fujitsu Patent Center

(57) ABSTRACT

Free spaces of a plurality of databases including the same data are monitored. The free spaces depend on fragmentation states of the respective databases. A first database is determined to be an active database, and a second database whose free space is larger than that of the first database is determined to be a standby database. Data relocation processing is performed on the second database, the data relocation processing including suspending data synchronization, initializing the standby database, copying data of the active database to the standby database, and resuming the data synchronization. Controlling is performed so that the data relocation processing is performed on a database other than the second database by changing the active database and the standby database.

14 Claims, 21 Drawing Sheets

RECORD

| HEADER | | | BODY |
|---|---|---|---|
| RECORD LENGTH | DIVISION FLAG | ADDRESS | DATA |
| 128 | OFF | 0x10000008 | (COLUMN 1, COLUMN 2, COLUMN 3, COLUMN 4, ⋯) |

HEARTBEAT MESSAGE

| KIND | MESSAGE LENGTH | TRANSMISSION SOURCE SERVER | FREE SPACE |
|---|---|---|---|
| HEARTBEAT | 16 | S1 | 3.0 GB |

INFORMATION PROCESSING APPARATUS AND INFORMATION PROCESSING SYSTEM

CROSS-REFERENCE TO RELATED APPLICATION

This application is based upon and claims the benefit of priority of the prior Japanese Patent Application No. 2020-006477, filed on Jan. 20, 2020, the entire contents of which are incorporated herein by reference.

FIELD

The embodiments discussed herein are related to an information processing apparatus and an information processing system.

BACKGROUND

A plurality of records are stored in the storage area of a database. There are cases in which, first, the plurality of records are tightly stored in such a manner that a gap is not created between records. However, there are cases in which, as a database is continuously used, addition and deletion of records having different lengths are repeated. Namely, when a record is updated, the length of the record could be changed. Consequently, a fragmentary free area could be created between records, and the number of continuous free areas in which new records are addable could be reduced. This phenomenon is referred to as fragmentation of the storage area.

If this fragmentation is left unattended, the efficiency in the use of the storage area is deteriorated. For example, even when the total data amount of target records is sufficiently smaller than the total capacity of the storage device, if the storage device includes many fragmentary free areas in which new records are not addable, the substantial free space of the storage device could be insufficient. In such cases, defragmentation could be performed. In defragmentation, the records are relocated on the storage area, so as to reduce the total fragmentary free area.

For example, there has been proposed a disk control system that relocates a plurality of records stored in a disk device. In the proposed disk control system, a plurality of records having continuous virtual addresses are read from the disk device and copied to a buffer. The plurality of records copied to the buffer is written back to the disk device while being rearranged in order of virtual address.

For example, there has also been proposed a computer system that resolves fragmentation of a non-volatile memory. The proposed computer system secures an active heap area and a standby heap area in a non-volatile memory. When the free space of the standby heap area becomes small, the computer system performs defragmentation in which the data blocks in the standby heap area are tightly relocated. In addition, the computer system switches the roles of the active and standby heap areas at arbitrary timing.

See, for example, Japanese Laid-open Patent Publication No. 2001-188658 and International Publication Pamphlet No. 2018/127948.

In order to improve availability of a database, there are cases in which a plurality of databases holding the same records are prepared and operated as a cluster system. In this cluster system, deterioration of the performance of the normal data processing could be prevented by performing relocation of the data in the plurality of databases sequentially, instead of simultaneously.

However, if an individual one of the databases performs its data relocation at different timing, these databases could have different fragmentation states and have different free spaces in which records are addable. Thus, after a record is successfully added to one database, data synchronization in which this addition of the record is reflected on another database could result in a failure if the free space of this another database is insufficient.

SUMMARY

According to one aspect, there is provided an information processing apparatus including: a memory configured to store items of free space information in association with a plurality of respective databases including same data, the items of free space information indicating free spaces that depend on fragmentation states of storage areas in which the same data is stored; and a processor configured to execute a process including: determining, among the plurality of databases, a first database to be an active database and a second database having a free space larger than that of the first database to be a standby database, based on the items of free space information, performing data relocation processing on the second database, the data relocation processing including suspending data synchronization in which updating of the active database is reflected on the standby database, initializing the standby database, copying data of the active database to the standby database, and resuming the data synchronization, and controlling such that the data relocation processing is performed on a database other than the second database by changing the active database and the standby database among the plurality of databases.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 illustrates a structural example of a record;

FIG. 16 illustrates a structural example of a heartbeat message;

DESCRIPTION OF EMBODIMENTS

Hereinafter, embodiments will be described with reference to drawings.

First Embodiment

A first embodiment will be described.

Figure 1:
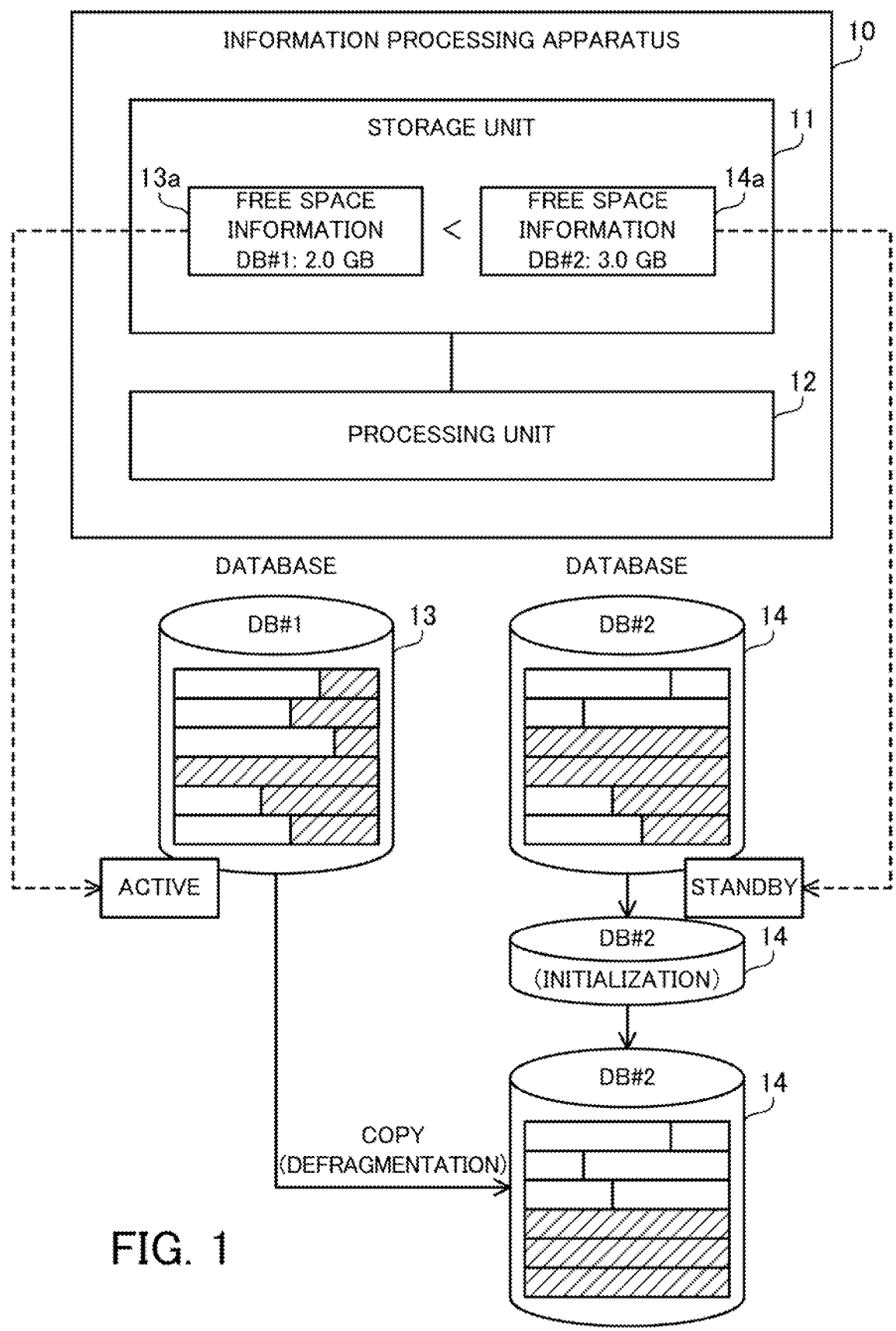
FIG. 1 illustrates an example of an information processing apparatus according to a first embodiment.

FIG. 1 illustrates an example of an information processing apparatus according to the first embodiment.

This information processing apparatus 10 according to the first embodiment controls relocation of data in a plurality of redundant databases. The information processing apparatus 10 may be a database server including any one of the databases. Alternatively, the information processing apparatus 10 may be a management server or a management terminal different from a database server including a database. The information processing apparatus 10 may be referred to as a computer or a data relocation apparatus, for example.

The information processing apparatus 10 includes a storage unit 11 and a processing unit 12. The storage unit 11 may be a volatile semiconductor memory such as a random access memory (RAM) or a non-volatile storage such as a hard disk drive (HDD) or a flash memory. The processing unit 12 is, for example, a processor such as a central processing unit (CPU), a graphics processing unit (GPU), or a digital signal processor (DSP). The processing unit 12 may include an electronic circuit designed for specified use, such as an application specific integrated circuit (ASIC) or a field programmable gate array (FPGA). The processor executes a program stored in a memory such as a RAM (the storage unit 11, or example). A group of processors may be referred to as a "multi-processor" or simply "a processor", as needed.

The storage unit 11 holds free space information indicating the free spaces of the respective databases. The free space information is collected by monitoring of the free spaces of the respective databases. The plurality of databases according to the first embodiment constitute a single cluster. The plurality of databases have the same data and are synchronized with each other to achieve redundancy. The data includes, for example, a plurality of records. A single record corresponds to a single row in a relational table, for example. The individual database may be an on-disk database that holds data by using a non-volatile storage such as an HDD. The individual database may be an in-memory database that holds data by using a volatile storage such as a RAM.

The free space of the individual database depends on the fragmentation state of the corresponding storage area holding data. Thus, even when the plurality of databases have the same data, if these databases have different fragmentation states, the databases could have different free spaces. The fragmentation could occur after different lengths of records are added and deleted repeatedly. The fragmentation could also occur after a record is updated to have a different length. Ideally, it is preferable that a plurality of records be tightly stored so that no free area is created between records. However, a fragmentary free area could be created between records as records are added, updated, and deleted. Since such a fragmentary free area does not have a sufficient size for insertion of a new record, the fragmentary free area becomes a dead space in which no record is addable. There are cases in which the fragmentary free area is not calculated as a free space.

For example, the plurality of databases include a database 13 and a database 14. The storage unit 11 holds free space information 13a indicating the free space of the database 13 and free space information 14a indicating the free space of the database 14. For example, the free space of the database 13 is 2 giga bytes (GB), and the free space of the database 14 is 3 GB. According to the first embodiment, the free space of the database 13 is smaller than that of the database 14. For example, among the plurality of databases, the free space of the database 13 is the smallest, and the free space of the database 14 is the largest.

The processing unit 12 determines an active database and a standby database from the plurality of databases based on the free space information stored in the storage unit 11. For example, based on the free space information 13a and 14a, the processing unit 12 determines one of the databases 13 and 14 to be an active database and the other database to be a standby database. The active database is a database of an active server that processes requests from clients. The active server performs data processing such as data search, insertion, update, and deletion in response to requests from the clients. The individual standby database functions as a backup for the active database. In a normal operation, data synchronization is performed between the active database and the individual standby database. In the data synchronization, updating of the active database is reflected on the individual standby database.

The processing unit 12 determines the active and standby databases under the constraint that the free space of the active database is smaller than that of any one of the standby databases. For example, the processing unit 12 determines the database having the smallest free space to be the active database. As described above, according to the first embodiment, the free space of the database 14 is larger than that of the database 13. Thus, the processing unit 12 determines the database 13 to be the active database and the database 14 to be a standby database.

The active database and the standby databases determined by the above method could be different from the original system settings specified by an administrator. In addition, if the free space of a database changes, the active database and the standby databases determined by the above method could change. In such a case, the processing unit 12 performs failover to change the roles of the individual databases. For example, if the database 13 and the database 14 are currently the standby database and the active database, respectively, the processing unit 12 switches the roles of the databases 13 and 14.

The processing unit 12 preferentially performs data relocation processing on a standby database determined as described above. For example, the processing unit 12 preferentially performs data relocation processing on a standby database having the largest free space. In the data relocation processing, defragmentation is performed to reduce the number of fragmentary free areas of the target database and to increase the free space of the target database.

In data relocation processing, the processing unit 12 suspends the data synchronization between the database 13 functioning as the active database and the database 14 functioning as a standby database. After the data synchronization is suspended, the database 14 is initialized. For example, a plurality of records stored in a volatile memory or a non-volatile storage are deleted. The initialization of the database 14 may be controlled by the processing unit 12. After the database 14 is initialized, the processing unit 12 copies the data in the database 13 to the database 14.

In this operation, the data is stored in the database 14 in such a manner that the database 14 has a smaller number of fragmentary free areas than that of the database 13. For example, a plurality of records are tightly stored in the database 14 in such a manner that an inter-record fragmentary free area present in the database 13 is absent in the database 14. If the plurality of records are not lined up in the order of logical number in the database 13, the records may be sorted according to logical number and stored in the database 14. When a single record has been divided into a plurality of portions in the database 13, the plurality of portions may be combined with each other and stored in the database 14.

Through this copying of the data from the database 13 to the database 14, the data is relocated, and the defragmentation of the database 14 is achieved. After the data copying, the processing unit 12 resumes the data synchronization between the databases 13 and 14.

After the data relocation processing on the database 14, the processing unit 12 changes the active database and the standby databases among the plurality of databases. In addition, the processing unit 12 performs control processing to perform the same data relocation processing on a database other than the database 14. In this way, defragmentation is performed on each of the plurality of databases that constitute the cluster, so as to reduce the total fragmentary free area in each of the databases.

For example, the processing unit 12 switches the roles of the active and standby databases to set the database 13 to a standby database and to set the database 14 to the active database. The processing unit 12 performs control processing to perform the same data relocation processing as described above on the database 13 functioning as a standby database. If there is a third database having a free space larger than that of the database 13 and smaller than that of the database 14, the processing unit 12 may perform the data relocation processing on the third database before the database 13. In this case, the database 13 continues to function as the active database.

In the information processing apparatus 10 according to the first embodiment, the plurality of redundant databases are sequentially selected one by one as the target database, and the data relocation processing including suspension of data synchronization, initialization, data copy, and resumption of the data synchronization is performed on the target database. In this way, fragmentation of the storage area of each of the plurality of databases is reduced, and the free spaces are recovered. In addition, while a standby database is performing the data relocation processing, since the active database is able to process requests from the clients, deterioration of the performance is prevented.

In addition, the free space of each of the plurality of databases is monitored, and the roles of the plurality of databases are controlled so that the active database has a smaller free space than those of the standby databases. In addition, the data relocation processing is preferentially performed on a database having a larger free space. In this way, even when the data relocation processing is performed on an individual database at different timing and even when the databases have different free spaces, the active database has a smaller free space than those of the standby databases. As a result, the risk of a failure of data synchronization, which reflects updating of the active database on a standby database, due to a lack of the capacity of the standby database is reduced. In addition, even in an intermediate state in which defragmentation is not finished on all the databases, the risk of a failure of the data synchronization is reduced.

Second Embodiment

Next, a second embodiment will be described.

Figure 2:
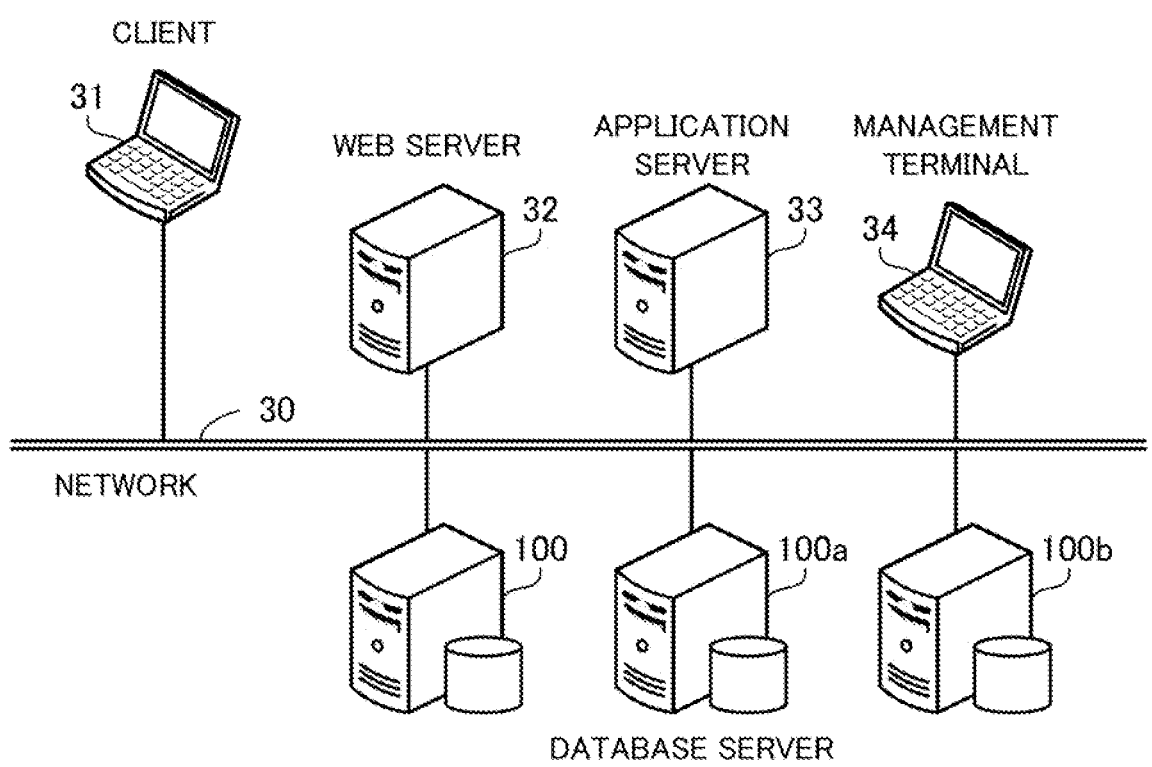
FIG. 2 illustrates an example of an information processing system according to a second embodiment.

FIG. 2 illustrates an example of an information processing system according to the second embodiment.

The information processing system according to the second embodiment is an online system that manages data by using a plurality of redundant databases. This information processing system is suitably used as an online system that operates non-disruptively for a long time, such as a banking system that handles bank account transactions of users or a securities company system that handles securities account transactions of users. The information processing system according to the second embodiment includes a network 30, a client 31, a Web server 32, an application server 33, a management terminal 34, and database servers 100, 100*a*, and 100*b*. The database server 100*a* corresponds to the information processing apparatus 10 according to the first embodiment.

The network 30 is a data communication network. The network 30 may include a wide area network such as the Internet or may include an in-house network such as a local area network (LAN). The client 31 is a client computer operated by a service user. The client 31 executes a Web browser. The client 31 accesses the Web server 32 in response to an operation of the service user, receives screen data from the Web server 32, and displays the screen data on a display.

The Web server 32 is a server computer that provides to a visual user interface to the service user. The Web server 32 is accessed by the client 31 and requests the application server 33 to perform data processing. The Web server 32 receives processing result data from the application server 33, generates screen data by using the processing result data, and transmits the generated screen data to the client 31.

The application server 33 is a server computer that executes an application program in which a business logic is implemented. The application server 33 receives a request for data processing from the Web server 32. During its data processing, there are cases in which the application server 33 generates a query for operating a database. The application server 33 transmits a query to an active-state database server among the database servers 100, 100*a*, and 100*b* and receives an execution result of the query. There are various kinds of queries, such as data search, insertion, update, and deletion. The application server 33 transmits the processing result data to the Web server 32.

The management terminal 34 is a client computer operated by an administrator of the online system. In response to an operation of the administrator, the management terminal 34 transmits various kinds of commands for database maintenance to the database servers 100, 100a, and 100b. These commands transmitted by the management terminal 34 will be described below.

The database servers 100, 100a, and 100b are server computers that manage databases. In principle, each of these databases is an in-memory database that stores all data in a volatile memory. In addition, each database is a relational database that manages a plurality of records in table format, for example. The database servers 100, 100a, and 100b constitute a single cluster. Each of these database servers included in the cluster will be referred to as a node, as needed. By providing each of the database servers 100, 100a, and 100b with a database having the same data, the data redundancy is achieved, and the fault tolerance is improved. It is preferable, from the viewpoint of convenience of data synchronization, that the database servers 100, 100a, and 100b have the same total capacity for their respective data storage areas.

Among the database servers 100, 100a, and 100b, one database server is an active-state database server, and the other two database servers are standby-state database servers. The active-state database server receives a query from the application server 33 and executes data processing based on the query. The standby-state database servers operate as backups for the active-state database server. When the database in the active-state database server is updated, this updating is reflected on the standby-state database servers through data synchronization.

Figure 3:
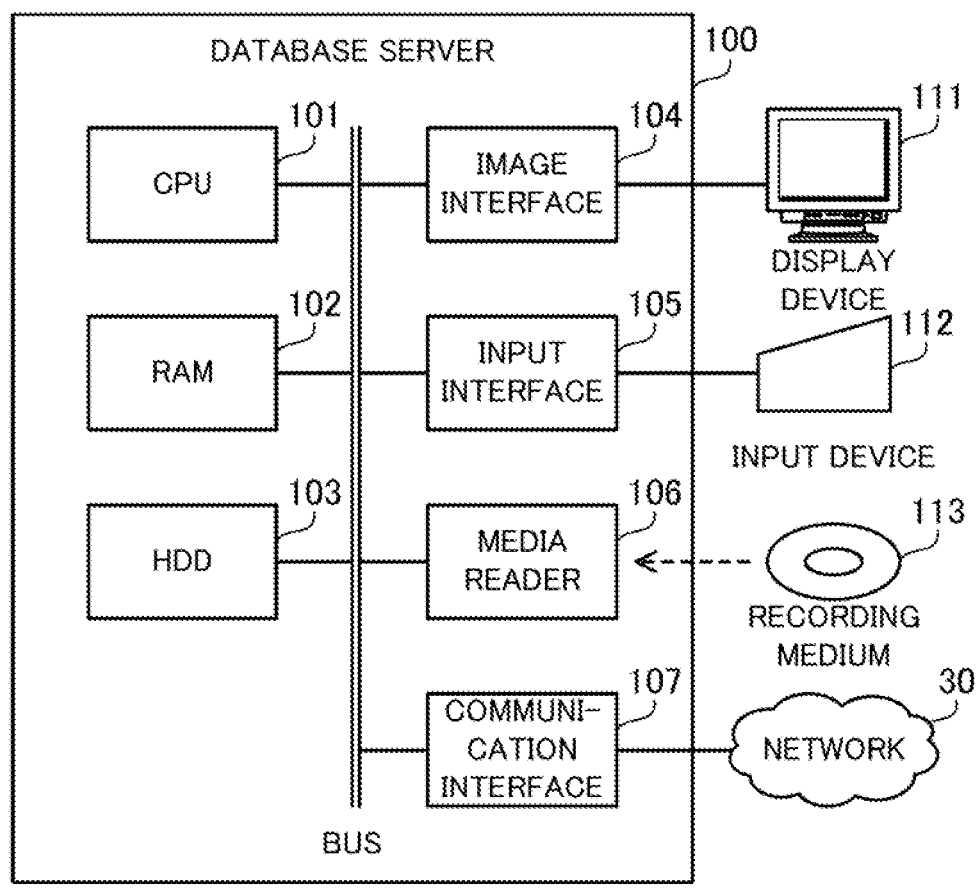
FIG. 3 is a block diagram illustrating a hardware example of a database server.

FIG. 3 is a block diagram illustrating a hardware example of the database server 100.

The database server 100 includes a CPU 101, a RAM 102, an HDD 103, an image interface 104, an input interface 105, a media reader 106, and a communication interface 107. These units of the database server 100 are connected to each other via a bus. The client 31, the Web server 32, the application server 33, the management terminal 34, and the database servers 100a and 100b may also be implemented by using the same hardware as that of the database server 100.

The CPU 101 is a processor that executes program commands. The CPU 101 loads a program or at least a part of data stored in the HDD 103 to the RAM 102 and executes the program. The CPU 101 may include a plurality of processor cores. The database server 100 may include a plurality of processors. In addition, a group of processors will be referred to as a "multiprocessor" or simply a "processor", as needed.

The RAM 102 is a volatile semiconductor memory that temporarily holds a program executed by the CPU 101 or data used by the CPU 101 for calculation. The database server 100 may include a different kind of memory other than a RAM or may include a plurality of memories.

The HDD 103 is a non-volatile storage that holds an operating system (OS), middleware, or software programs such as application software, and data. The database server 100 may include a different kind of storage such as a flash memory or a solid state drive (SSD) or may include a plurality of storages.

The image interface 104 outputs an image to a display device 111 connected to the database server 100 in accordance with a command from the CPU 101. Examples of the display device 111 include various kinds of display devices, such as a cathode ray tube (CRT) display, a liquid crystal display (LCD), an organic electro-luminescence (OEL) display, or a projector. A different output device other than the display device 111 may be connected to the database server 100. For example, a printer may be connected to the database server 100.

The input interface 105 receives an input signal from an input device 112 connected to the database server 100. Examples of the input device 112 include various kinds of input devices, such as a mouse, a touch panel, a touch pad, and a keyboard. A plurality of kinds of input devices may be connected to the database server 100.

The media reader 106 is a reading device that reads a program or data recorded in a recording medium 113. Various kinds of recording media may be used as the recording medium 113. For example, the recording medium 113 may be a magnetic disk such as a flexible disk (FD) or an HDD, an optical disc such as a compact disc (CD) or a digital versatile disc (DVD), or a semiconductor memory. For example, the media reader 106 copies a program or data read from the recording medium 113 in another recording medium such as the RAM 102 or the HDD 103. The read program is executed by the CPU 101, for example. The recording medium 113 may be a portable recording medium and used for distribution of a program or data. The recording medium 113 or the HDD 103 may be referred to as a computer-readable recording medium, as needed.

The communication interface 107 is connected to the network 30 and communicates with other information processing apparatuses such as the application server 33, the management terminal 34, and the database servers 100a and 100b via the network 30. The communication interface 107 is, for example, a wired communication interface connected to a wired communication apparatus such as a switch or a router.

The information processing system according to the second embodiment illustrated in FIG. 2 may be applied to a securities trading system. Next, an application example of the information processing system will be described.

Figure 4:
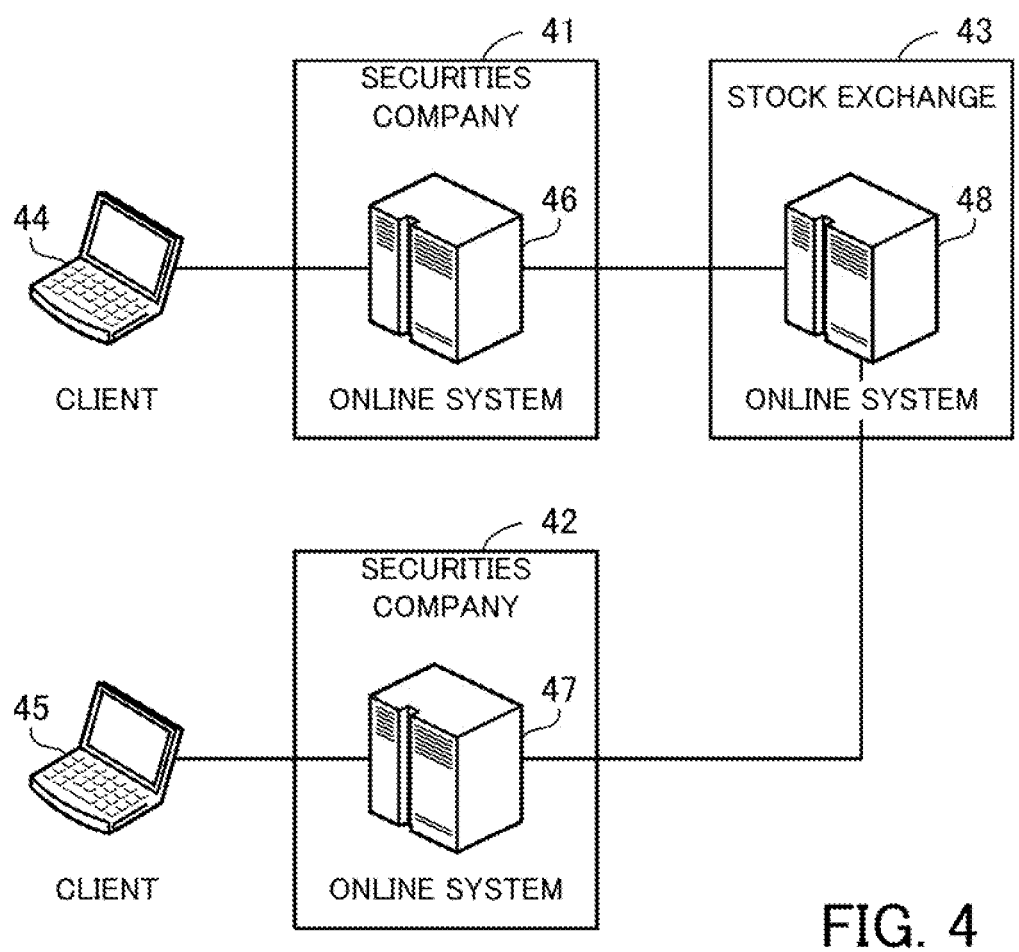
FIG. 4 illustrates an application example of the information processing system.

FIG. 4 illustrates an application example of the information processing system.

A securities trading system mediates buying and selling of securities such as stocks. The securities trading system includes clients such as clients 44 and 45 and online systems 46 to 48. These online systems 46 to 48 may be realized by using an information processing system including a plurality of database servers as illustrated in FIG. 2.

The clients 44 and 45 are client computers used by investors. The investors request securities companies such as securities companies 41 and 42 to buy and sell securities. The investor who uses the client 44 is a member of the securities company 41, and the client 44 transmits an order message indicating a sell order or a buy order to the online system 46. The investor who uses the client 45 is a member of the securities company 42, and the client 45 transmits an order message indicating a sell order or a buy order to the online system 47.

The online system 46 is an information processing system of the securities company 41, and the online system 47 is an information processing system of the securities company 42. The securities companies 41 and 42 buy and sell securities at a stock exchange 43 on behalf of their investors. The online systems 46 and 47 operate as clients with respect to the online system 48 of the stock exchange 43 and operate as servers with respect to the clients 44 and 45.

The online system 46 includes an application interface that receives order messages from the client 44. In response to an order message received from the client 44, the online system 46 transmits an order message to the online system 48 and receives an execution notification message indicating a finalized buy or sell agreement from the online system 48. The online system 46 transmits the execution notification message to the client 44. Likewise, the online system 47 transmits an order message to the online system 48 and receives an execution notification message indicating a finalized buy or sell agreement from the online system 48.

The online system 48 is an information processing system of the stock exchange 43. The online system 48 receives order messages indicating sell orders and buy orders from the online systems 46 and 47. The online system 48 performs matching between a sell order and a buy order. Specifically, when the online system 48 detects a combination of a sell order and a buy order that satisfies a desired condition, the online system 48 finalizes a buy and sell agreement. Regarding a sell order and a buy order on which a buy and sell agreement has been finalized, the online system 48 transmits an execution notification message to each of the online systems 46 and 47.

Figure 5:
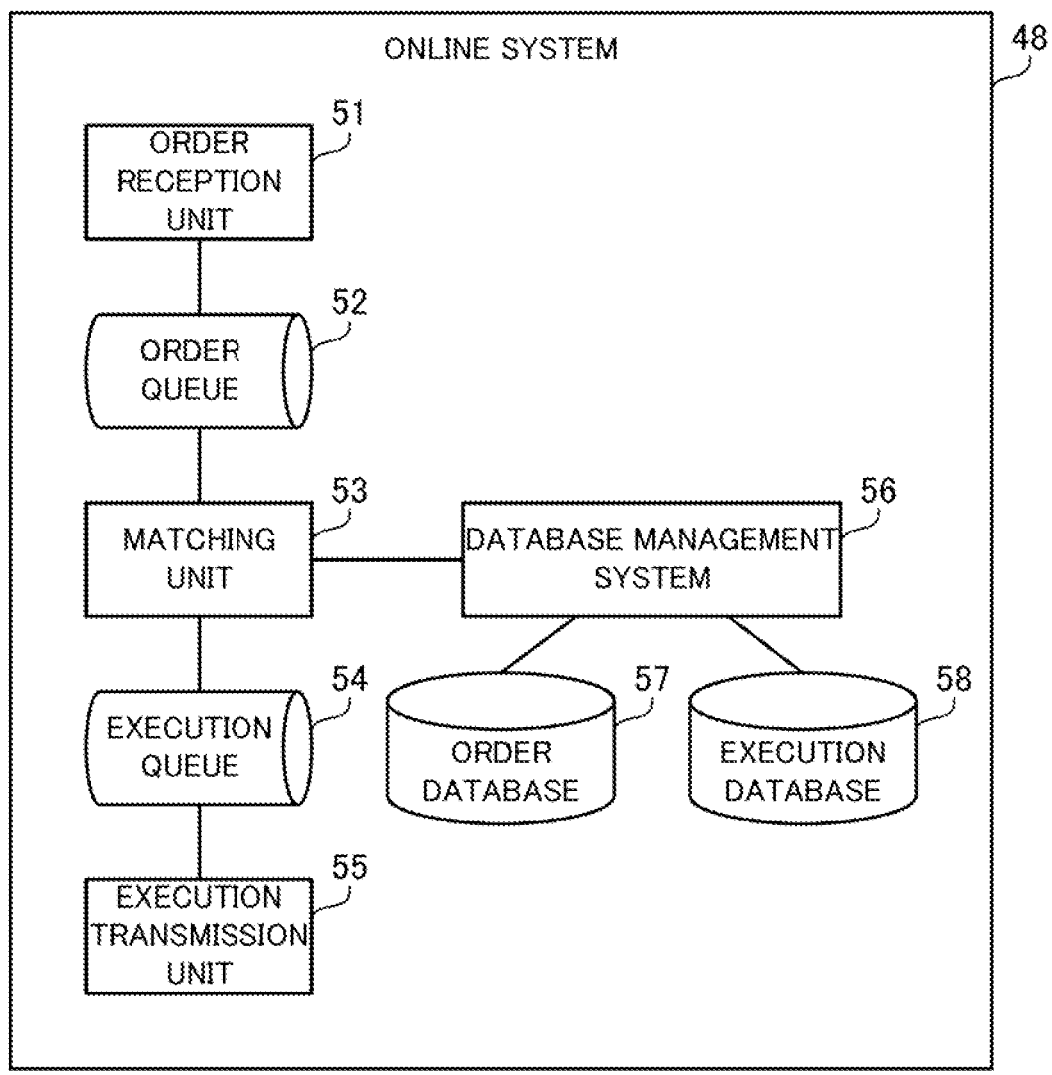
FIG. 5 is a block diagram illustrating a functional example of an online system.

FIG. 5 is a block diagram of a functional example of the online system 48.

The online system 48 includes an order reception unit 51, an order queue 52, a matching unit 53, an execution queue 54, an execution transmission unit 55, a database management system (DBMS) 56, an order database 57, and an execution database 58. For example, each of the order queue 52, the execution queue 54, the order database 57, and the execution database 58 is realized by using a storage area of a RAM. For example, each of the order reception unit 51, the matching unit 53, the execution transmission unit 55, and the DBMS 56 is realized by using a program executed by a CPU.

The order reception unit 51 receives order messages from the online systems 46 and 47. The order reception unit 51 inserts the received order messages into the order queue 52. The order queue 52 is a first-in first-out (FIPO) type buffer memory in which unprocessed order messages are stored in order of reception. The order reception unit 51 adds the newest order message to the end of the order queue 52. The matching unit 53 extracts the oldest order message among the unprocessed order messages from the top of the order queue 52.

The matching unit 53 performs matching between a sell order and a buy order. Specifically, the matching unit 53 extracts the order messages one by one from the top of the order queue 52. If the extracted order message indicates a sell order, the matching unit 53 compares this current sell order with unexecuted buy orders. If the extracted order message indicates a buy order, the matching unit 53 compares this current buy order with unexecuted sell orders. If there is an order that satisfies the corresponding desired condition, the matching unit 53 finalizes a buy and sell agreement and inserts an execution notification message indicating the executed combination of the sell order and the buy order into the execution queue 54. If there is no order that satisfies the corresponding desired condition, the matching unit 53 stores this current order as an unexecuted order.

The matching unit 53 uses databases to manage sell orders and buy orders. The matching unit 53 issues database queries to the DBMS 56 and acquires query execution results from the DBMS 56. There are various kinds of queries such as a search query for searching for a record that matches a certain condition, an insert query for inserting a new record, an update query for rewriting a value of an existing record, and a delete query for deleting an existing record.

The execution queue 54 is a FIFO type buffer memory in which untransmitted execution notification messages are stored in order of generation. The matching unit 53 adds the newest execution notification message to the end of the execution queue 54, and the execution transmission unit 55 extracts the oldest execution notification message among the untransmitted execution notification messages from the top of the execution queue 54. The execution transmission unit 55 extracts the execution notification messages one by one from the top of the execution queue 54 and transmits the extracted execution notification message to the online system of a suitable securities company.

The DBMS 56 manages the order database 57 and the execution database 58. The DBMS 56 receives a query from the matching unit 53 and operates a record in the order database 57 or the execution database 58 in accordance with the received query. The DBMS 56 outputs a query execution result to the matching unit 53. The order database 57 holds records indicating unexecuted sell orders and records indicating unexecuted buy orders. The execution database 58 holds records indicating executed sell orders and records indicating executed buy orders.

Next, fragmentation of a database storage area will be described.

Figure 6:
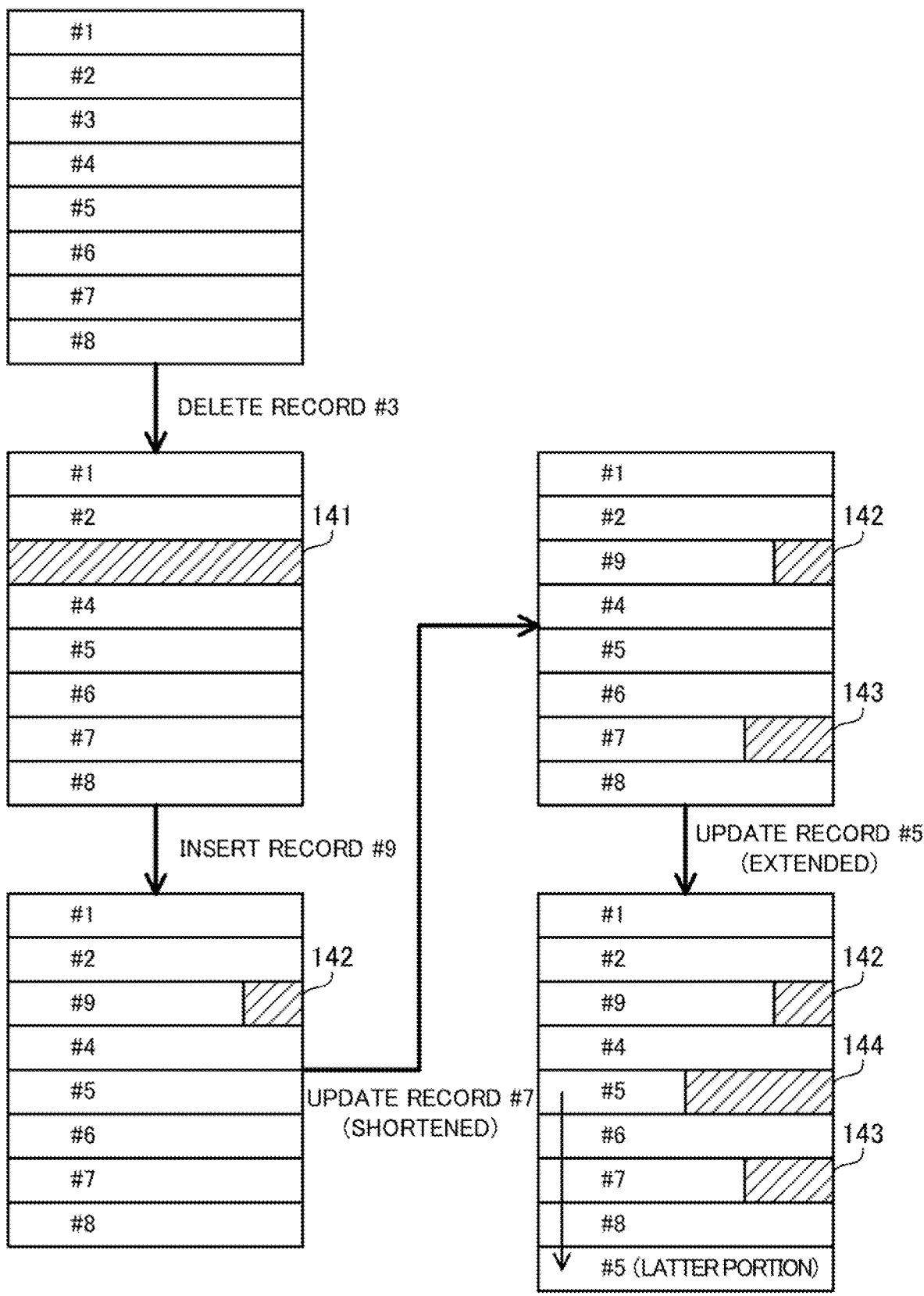
FIG. 6 illustrates examples of fragmentation of a storage area.

FIG. 6 illustrates an example of fragmentation of a storage area.

A plurality of records are stored in the data storage area of the RAM in each of the database servers 100, 100a, and 100b. A single record corresponds to a single row in a relational table. It is preferable that the plurality of records be tightly stored in such a manner that a gap is not created between records, to efficiently use the storage area. However, if the database servers 100, 100a, and 100b are continuously operated for a long time, records are inserted, updated, and deleted repeatedly, and as a result, a fragmentary free area is created between records. Such a fragmentary free area is a dead space that does not have a size in which a new record is not insertable.

For example, first, eight records #1 to #8 are tightly stored in this order in FIG. 6. If the record #3 is deleted from this initial state, a free area 141 is created between the records #2 and #4. However, since the free area 141 is able to hold another record, the free area 141 is not a fragmentary free area. Next, a record #9 is inserted into the free area 141. Since the record #9 is shorter than the record #3, a free area 142 is created between the record #9 and the record #4 thereafter. This free area 142 is a fragmentary free area having a small size.

Next, the record #7 is updated. This update shortens the record #7. For example, the number of characters in the variable-length string included in the record #7 is reduced. As a result, a free area 143 is created between the record #7 and the record #8 thereafter. This free area 143 is a fragmentary free area having a small size. Next, the record #5 is updated. This update extends the record #5. For example, the number of characters in the variable-length string included in the record #5 is increased. However, since there is no gap between the record #5 and the record #6 thereafter, the record #5 is not directly extendable. Thus, the body including data is moved to the end of the record #8 while the header including the management information about the record #5 is left at the original location. Namely, the record #5 is divided into two portions. In this way, a free area 144 is created between the header of the record #5 and the record #6. This free area 144 is a fragmentary free area having a small size.

As described above, a fragmentary free area into which a new record is not insertable could be created when records having different lengths are inserted and deleted repeatedly.

In addition, a fragmentary free area could be created when a record is updated to have a different record length. The fragmentation of a storage area progresses as more fragmentary free areas are created among records.

The "free space" is calculated for an individual database. The free space may be defined as the total size of free areas into which new records are insertable. In this case, while the size of continuous free areas into which at least one record is insertable is calculated as a part of the free space, the size of fragmentary free areas into which a record is not insertable is not calculated as a part of the free space. Thus, the free space of a database is reduced as the fragmentation progresses. Even when a plurality of databases have the same total capacity and the same data, if the plurality of databases have different fragmentation states, different free spaces could be calculated. Next, a method of calculating the free space of a database will be described.

Figure 7:
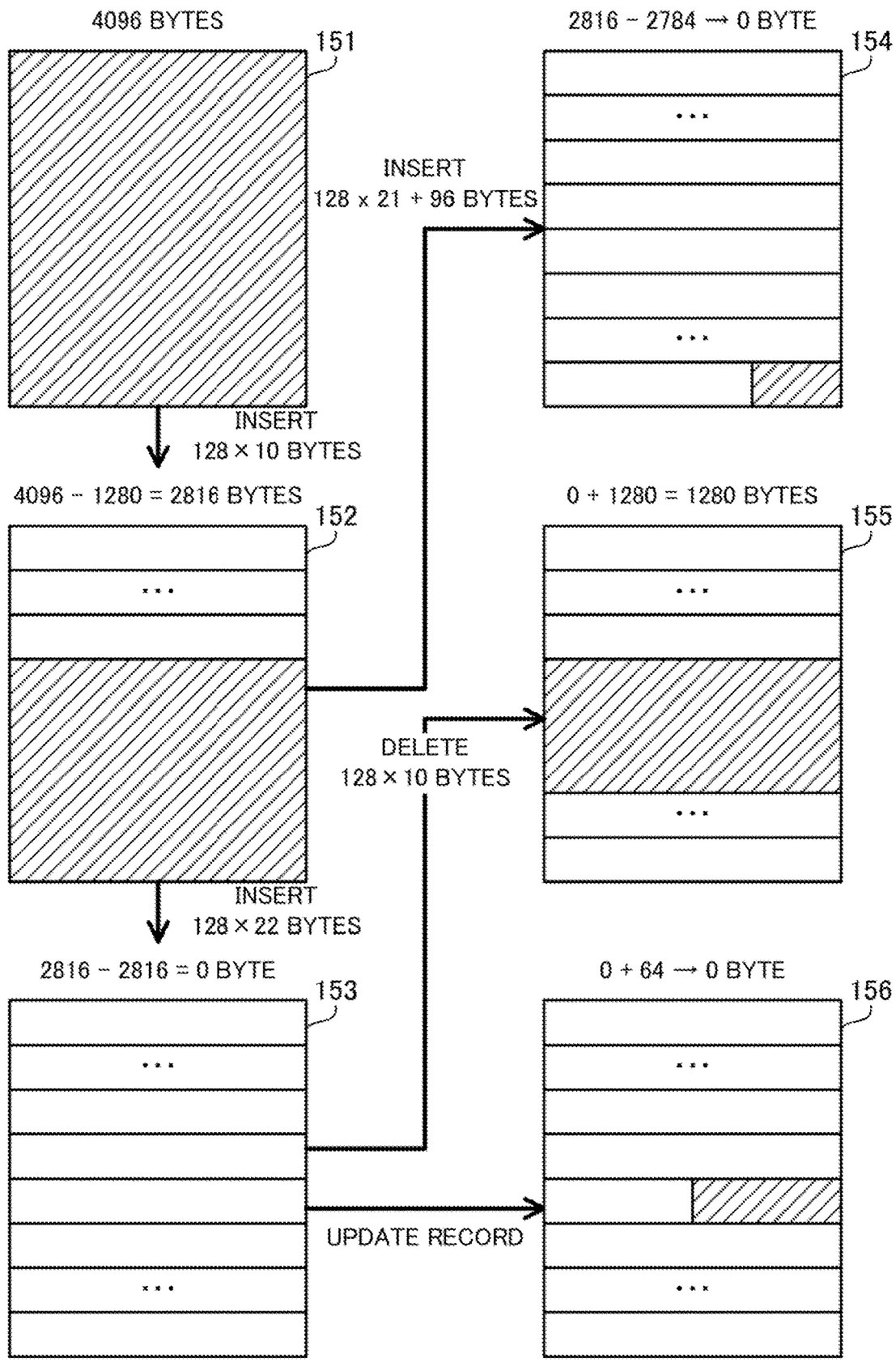
FIG. 7 illustrates free space calculation examples.

FIG. 7 illustrates a free space calculation method.

The data storage area of the RAM in each of the database servers 100, 100a, and 100b is divided into blocks, each of which is a unit storage area. These blocks may be referred to as pages or segments, as needed. A single block has a fixed size, which is, for example, 4096 bytes. The total free space of a database is the sum of free spaces of the individual blocks calculated by the following method. States 151 to 156 each indicate a single block state.

The state 151 is an initial state in which no record is stored in a block. The free space in the initial state is equal to the size of this block. Thus, the free space in the state 151 is 4096 bytes. The state 152 is a state obtained by collectively writing 128 bytes×10 records in the block in the state 151. If the records are tightly written, the free space is reduced by the data amount of the written records. Thus, the free space in the state 152 is calculated to be 2816 bytes by subtracting 128×10 bytes from the 4096 bytes.

The state 153 is a state obtained by collectively writing 128 bytes×22 records in the block in the state 152. Consequently, since 32 records are stored without a gap, there is no free area in this block. The free space in the state 153 is calculated to be 0 byte by subtracting 128×22 bytes from the 2816 bytes.

The state 154 is a state obtained by collectively writing 128 bytes×21 records and 96 bytes×one record in the block in the state 152. 32 records are stored without a gap, and a free area of 32 bytes still remains at the end of the block. Even when a free area still remains in a block, if the next record is not insertable into the free area, the free space of the block is calculated to be 0. Thus, since the next record is not insertable into the block, the free space of the state 154 is calculated to be 0.

The state 155 is a state obtained by deleting 128 bytes×10 records from the block in the state 153. When a record is deleted, the free space is increased by the data amount of the deleted records. Thus, the free space in the state 155 is calculated to be 1280 bytes by adding 128×10 bytes to 0 byte. The state 156 is a state obtained by updating a single record of the block in the state 153. The length of the updated record is reduced from 128 bytes to 64 bytes. Even when a fragmentary free area is created when the record is updated, the free space of the block is not increased. Thus, the free space in the state 156 is calculated to be 0. The same applies to a case in which a fragmentary free area is created when a record is divided.

If fragmentation is left unattended, the free space of a database is reduced. There are cases in which the free space becomes significantly smaller than the difference between the total capacity of the data storage area and the total data amount of the records stored. Thus, the number of records expected to be stored in the database at the design of the information processing system could not be stored, and shortage of the capacity could occur. Thus, it is preferable that defragmentation for relocating the records and reducing the total fragmentary free area be performed. An increase in calculated free space is expected by performing defragmentation.

Since an online system expected to continuously operate for a long time needs to perform defragmentation while providing services to users, how the defragmentation is performed is important. If the active-state database server performs defragmentation, service delay could occur. If exclusive control processing is performed through exclusive lock on the data storage area so that access for service execution and access for defragmentation will not collide with each other, service delay occurs. In addition, if a plurality of database servers perform defragmentation sequentially instead of simultaneously, one database server could have a free space significantly different from that of another database server. In such a case, there is a risk of a failure of data synchronization, as will be described.

Figure 8:
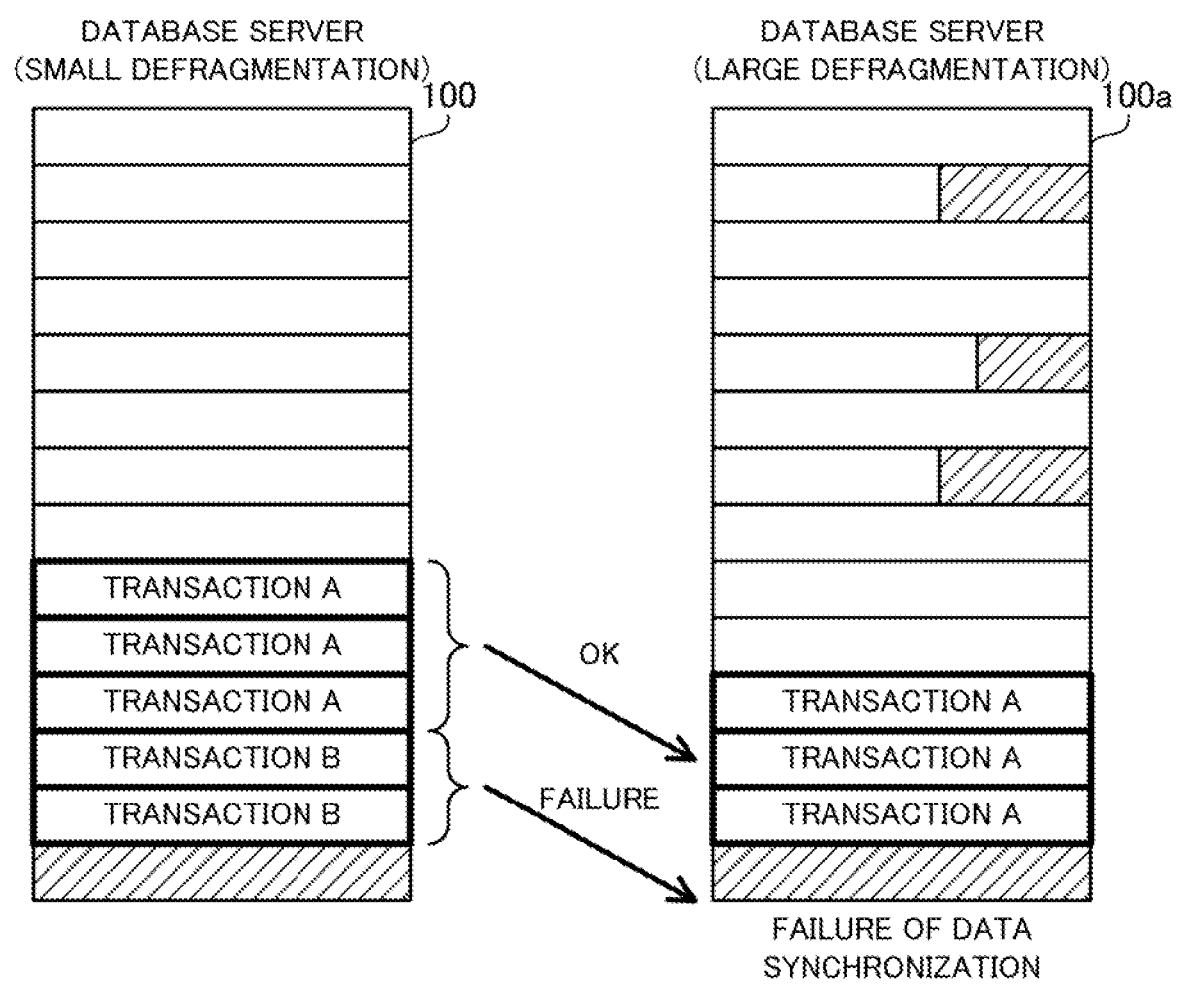
FIG. 8 illustrates an example of a failure of data synchronization between database servers.

FIG. 8 illustrates an example of a failure of data synchronization between database servers.

The following description assumes that the database server 100 is the active state and the database server 100a is a standby state. In addition, the fragmentation of the database server 100 is small, and the fragmentation of the database server 100a is large. Namely, the database server 100 has a free space larger than that of the database server 100a.

The database server 100 commits a transaction A of inserting three records into its database. Accordingly, the database server 100 writes these three records to its data storage area. In addition, the database server 100 forwards the three records of the transaction A to the database server 100a, to achieve redundancy. The database server 100a writes these three records in its data storage area.

The data synchronization between the database servers 100 and 100a may be performed in the background after completion of the commit. In addition, since there is only one active-state database server, the database server 100b is also operating as a standby-state database server. Thus, the transaction committed by the database server 100 is also reflected on the database server 100b. The records may be forwarded to the database server 100b from the database server 100 or 100a.

Next, the database server 100 commits a transaction B of inserting two records into its database. Accordingly, the database server 100 writes these two records to its data storage area. With its sufficient free space, the database server 100 succeeds in this writing. The database server 100 forwards the two records of the transaction B to the database server 100a. While the database server 100a attempts to write these two records in its data storage area, since the free space is not sufficient, the database server 100a fails to write the two records. Thus, the data synchronization results in a failure.

As described above, when a plurality of database servers perform defragmentation sequentially, the free space of one database server could significantly differ from that of another database server. There are cases in which the free space of the active-state database server becomes larger than that of a standby-state database server. In such cases, while the active-state database server succeeds in a commit itself, the data synchronization will result in a failure. As a result, the corresponding standby-state database server could be determined to be detective and separated from the cluster. The data redundancy is also deteriorated.

The database servers 100, 100*a*, and 100*b* according to the second embodiment reduce their fragmentary free areas by relocating their records in accordance with the following method.

According to the second embodiment, the priority levels of the database servers 100, 100*a*, and 100*b* are determined based on their respective free spaces. A database server having the smallest free space is ranked first, and a database server having the largest free space is ranked third. The database server ranked first operates in the active state, and the database servers ranked second and third operate in the standby state. The database servers having low priority levels are sequentially separated from the cluster one by one. After the initialization in which all the records are deleted is performed on a database server that has been separated from the cluster, this database server is incorporated into the cluster again. Since the database of the database server that has been incorporated into the cluster is empty, all the records from another database server are copied to the database server. In this operation, the records are relocated.

Figure 9:
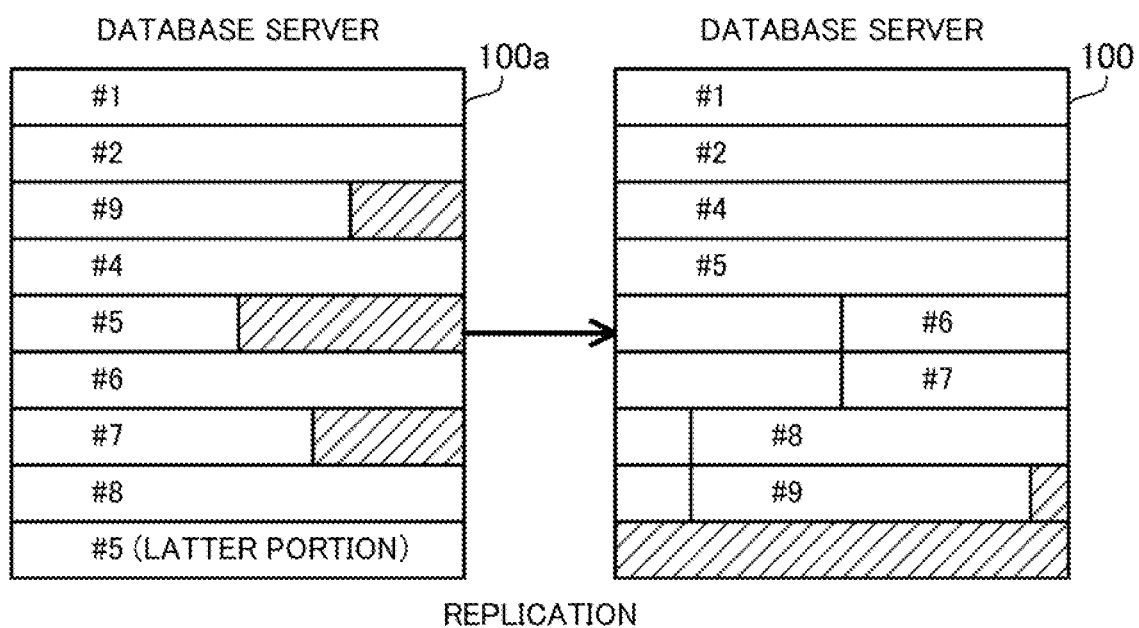
FIG. 9 illustrates an example of data relocation in replication.

FIG. 9 illustrates an example of data relocation in replication.

The following description assumes that the database server 100*a* has the smallest free space and has a priority level ranked first. Thus, the database server 100*a* is in the active state. The database server 100 has the largest free space and has a priority level ranked third. Thus, the database server 100 is separated from the cluster, initialized, and incorporated into the cluster again.

When the database server 100 is incorporated into the cluster, replication is performed. In replication, the records stored in the database server 100*a* are copied to the database server 100. Herein, records #1, #2, and #4 to #9 are copied from the database server 100*a* to the database server 100. In this replication, defragmentation is substantially performed in the database server 100.

The database server 100*a* sorts the plurality of records to be transmitted in ascending order of the logical numbers assigned to these records. Thus, while the record #9 is located between records #2 and #4 on the storage area, the record #9 is transmitted after the record #8. In addition, if there is a record whose header and body are separated from each other, the database server 100*a* combines the header and the body. Thus, while the record #5 has been divided into portions on the storage area, these portions of the record #5 are put together as an unseparated record. The database server 100*a* transmits the plurality of records that have been sorted and combined as described above to the database server 100 in ascending order of logical number.

The database server 100 tightly stores the records received from the database server 100*a* in its storage area in ascending order of logical number so that there will be as few gaps as possible in the storage area. Thus, the database server 100 tightly writes the records #1, #2, and #4 to #9 in order of reception so that there will be as few fragmentary free areas as possible among records. As a result, the total fragmentary free area of the database server 100 becomes less than that of the database server 100*a*. Thus, after the defragmentation, the database server 100 acquires more free space. In addition, the plurality of records are lined in order of logical number, and none of the records are divided into portions. Thus, the efficiency of the record search by the database server 100 is improved.

Next, cluster control processing performed on a plurality of database servers will be described. First, for ease of description, a cluster of two database servers 100 and 100*a* will be described.

Figure 10:
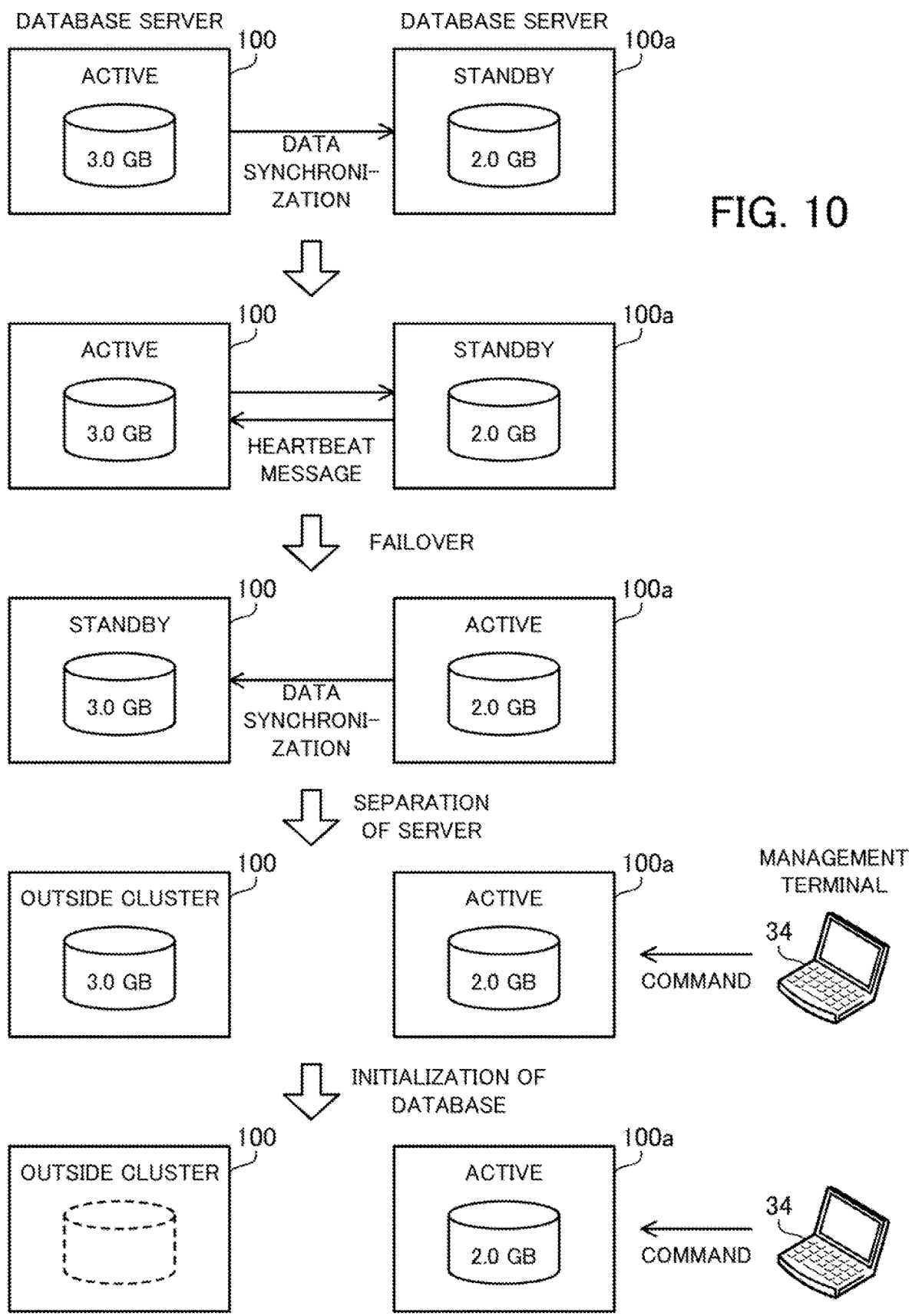
FIG. 10 is a first diagram illustrating an example of cluster control processing performed between two servers.

FIG. 10 is a first diagram illustrating an example of cluster control processing performed between two servers.

The following description assumes that the system settings made by the administrator specify that the priority level of the database server 100 is ranked first and the priority level of the database server 100*a* is ranked second. In this case, the database server 100 operates in the active state, and the database server 100*a* operates in the standby state. The database server 100 executes a commit, and data synchronization from the database server 100 to the database server 100*a* is performed.

Next, the database server 100 transmits a heartbeat message to the database server 100*a*, and the database server 100*a* transmits a heartbeat message to the database server 100. The individual heartbeat message is a control message for alive check and is transmitted among a plurality of database servers regularly (for example, every three seconds). The heartbeat message transmitted by the database server 100 includes information about its free space. The heartbeat message transmitted by the database server 100*a* includes information about its free space.

The following description assumes that the free space of the database server 100 is 3 GB and the free space of the database server 100*a* is 2 GB. The database servers 100 and 100*a* obtain each other's free spaces through these heartbeat messages.

Next, the database servers 100 and 100*a* constituting the cluster determine the priority levels in ascending order of free space. The priority levels determined at this point could differ from those of the system settings specified by the administrator. As a result, the database server 100*a* is ranked first, and the database server 100 is ranked second. The database server 100*a* whose priority level is ranked first declares to the database server 100 that the database server 100*a* will operate in the active state. Consequently, the database server 100*a* shifts to the active state, and the database server 100 shifts to the standby state. As a result, the database server 100*a* executes a commit, and data synchronization from the database server 100*a* to the database server 100 is performed.

Next, the active-state database server 100*a* receives a separate command from the management terminal 34. This separate command includes identification information indicating the database server 100 to be separated from the cluster. The database server 100*a* separates the database server 100 from the cluster in accordance with the separate command. In this separation, the database server 100*a* suspends the data synchronization with the database server 100 and suspends the exchange of heartbeat messages with the database server 100 for alive check.

Next, the database server 100 outside the cluster receives an initialize command from the management terminal 34. The database server 100 initializes its database in accordance with the initialize command. In the initialization, the database server 100 deletes all the records stored in the data storage area of its RAM. Alternatively, in place of deleting the records, the records may be made unrecognizable by rewriting the database management information.

Figure 11:
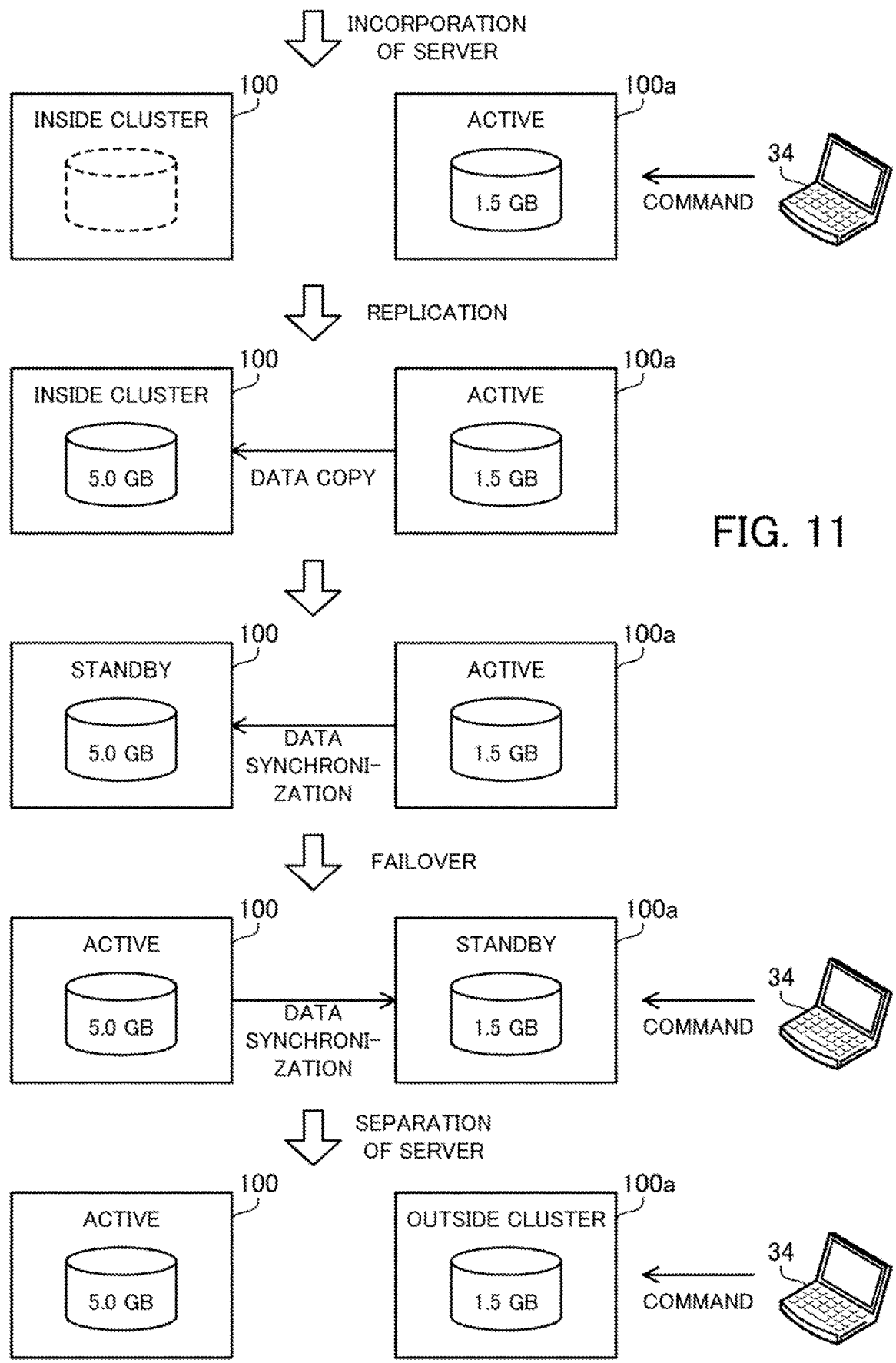
FIG. 11 is a second diagram illustrating the example of the cluster control processing performed between the two servers.

FIG. 11 is a second diagram illustrating the example of the cluster control processing performed between the two servers.

Next, the active-state database server 100*a* receives an incorporate command from the management terminal 34.

The incorporate command includes identification information indicating the database server 100 that is to be incorporated into the cluster. The database server 100a incorporates the database server 100 into the cluster in accordance with the incorporate command. Since the database server 100a has continuously operated in the active state, the free space of the database server 100a has dropped to 1.5 GB.

To incorporate the database server 100, the database server 100a performs replication. As described above, in the replication, the database server 100a copies all the records stored in the data storage area of its RAM to the database server 100. The records are tightly written in the data storage area of the RAM of the database server 100 so that as few fragmentary free areas as possible are created. In this example, due to the effect of the defragmentation, the free space of the database server 100 has recovered to 5 GB.

Upon completion of the replication, the database server 100a completes the incorporation of the database server 100 into the cluster. In the incorporation, the database server 100a resumes the exchange of heartbeat messages with the database server 100 for alive check and resumes the data synchronization with the database server 100. The incorporated database server 100 operates in the standby state.

Next, at least one of the database servers 100 and 100a receives a failover command from the management terminal 34. The failover command signifies forcible switching between the active state and the standby state. The failover command may include the identification information of the database server that is to be set in the active state or the identification information of the database server that is to be set in the standby state. In accordance with the failover command, the database server 100 shifts to the active state, and the database server 100a shifts to the standby state. Accordingly, the database server 100 executes a commit, and the data synchronization from the database server 100 to the database server 100a is performed.

Next, the active-state database server 100 receives a separate command from the management terminal 34. The database server 100 separates the database server 100a from the cluster in accordance with the separate command. In this separation, the database server 100 suspends the data synchronization with the database server 100a and suspends the exchange of heartbeat messages with the database server 100a for alive check.

Figure 12:
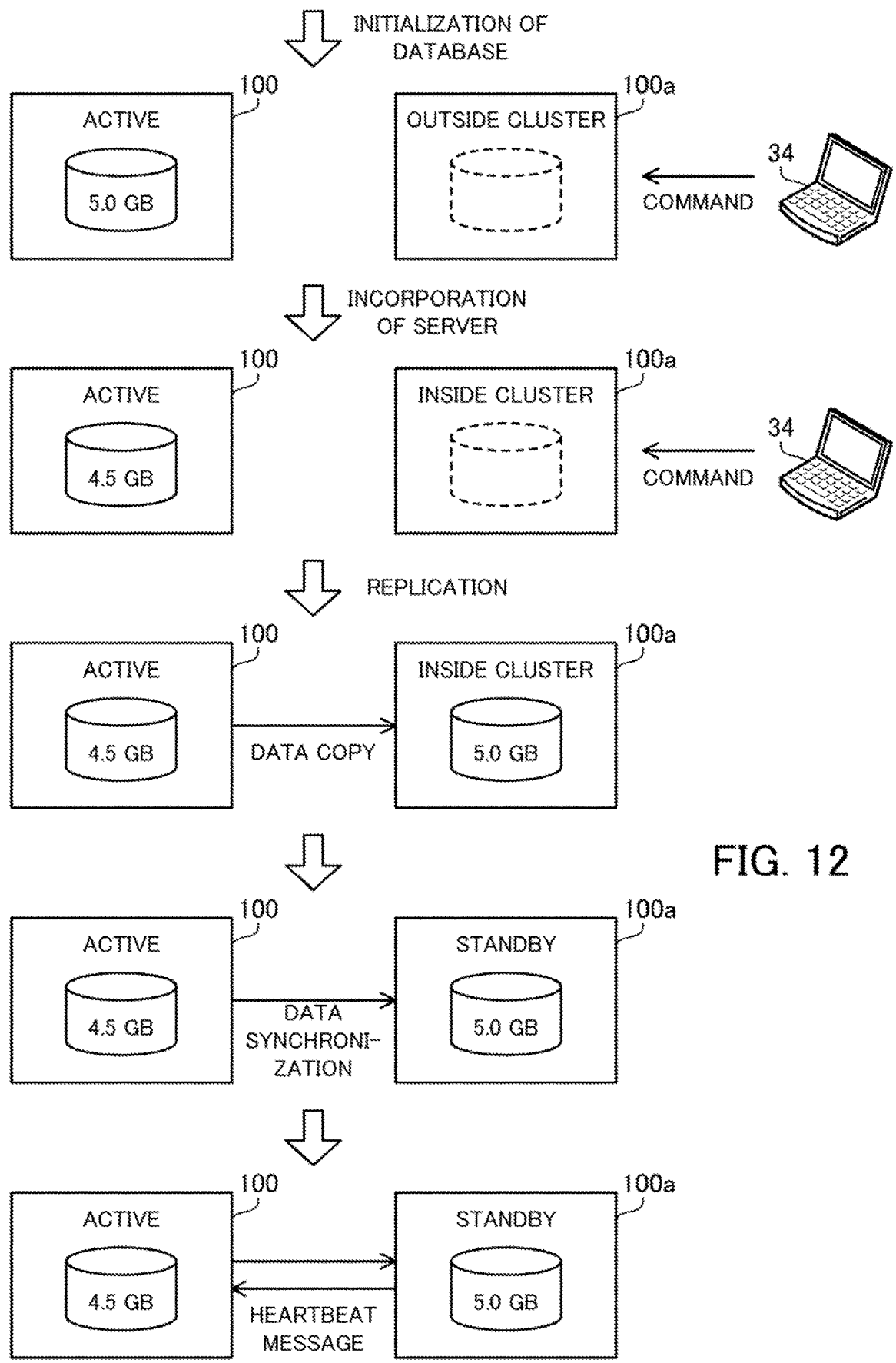
FIG. 12 is a third diagram illustrating the example of the cluster control processing performed between the two servers.

FIG. 12 is a third diagram illustrating the example of the cluster control processing performed between the two servers.

Next, the database server 100a outside the cluster receives an initialize command from the management terminal 34. The database server 100a initializes its database in accordance with the initialize command. In the initialization, the database server 100a deletes all the records stored in the data storage area of its RAM. Next, the active-state database server 100 receives an incorporate command from the management terminal 34. The database server 100 incorporates the database server 100a into the cluster in accordance with the incorporate command. Since the database server 100 has continuously operated in the active state, the free space of the database server 100 has dropped to 4.5 GB.

To incorporate the database server 100a, the database server 100 performs replication. In the replication, the database server 100 copies all the records stored in the data storage area of its RAM to the database server 100a. The records are tightly written in the data storage area of the RAM of the database server 100a so that as few fragmentary free areas as possible are created. In this example, due to the effect of the defragmentation, the free space of the database server 100a has recovered to 5 GB.

Upon completion of the replication, the database server 100 completes the incorporation of the database server 100a into the cluster. In the incorporation, the database server 100 resumes the exchange of heartbeat messages with the database server 100a for alive check and resumes the data synchronization with the database server 100a. The incorporated database server 100a operates in the standby state.

Next, a cluster of three database servers 100, 100a, and 100b will be described.

Figure 13:
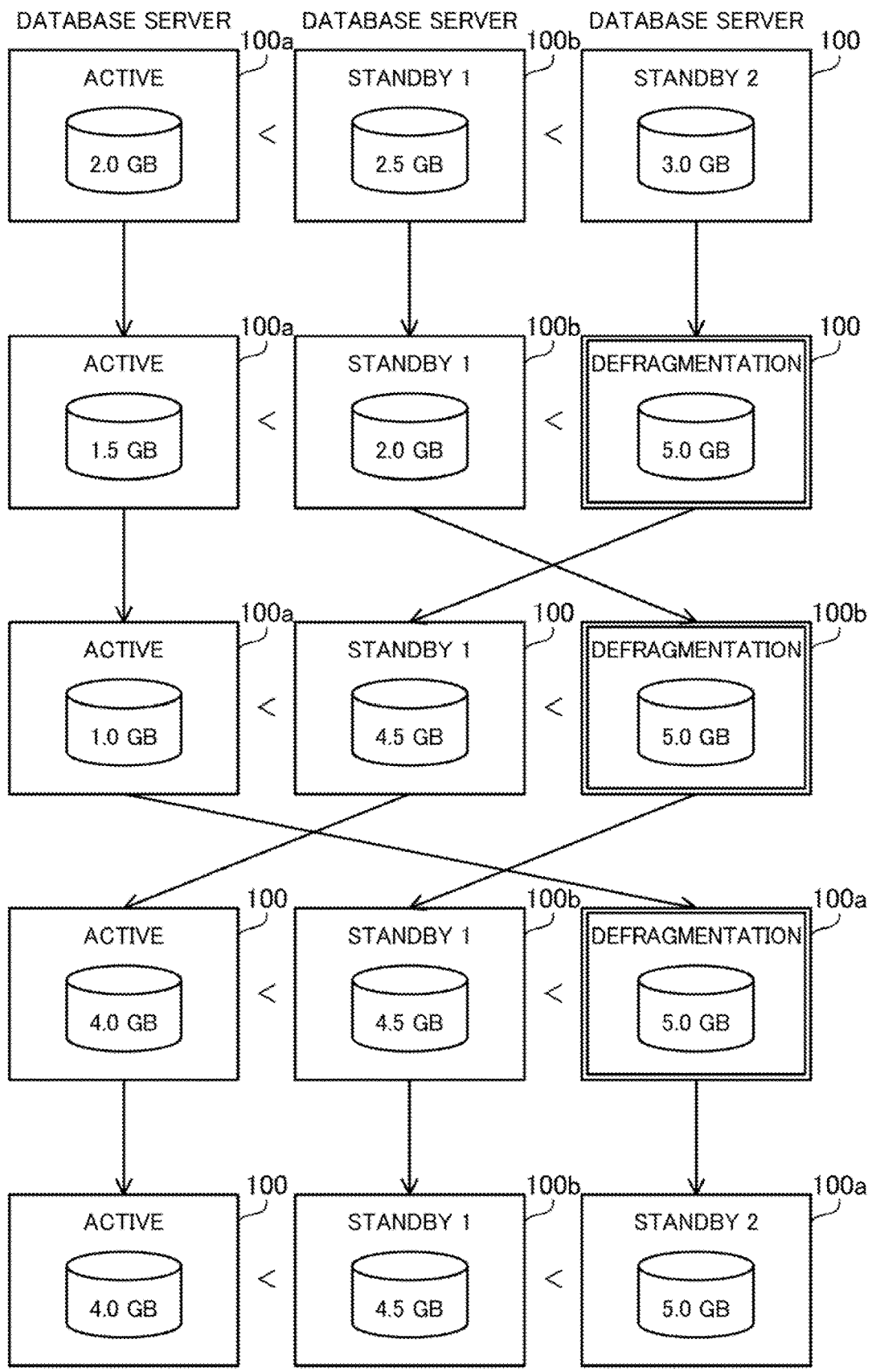
FIG. 13 illustrates an example of cluster control processing performed among three servers.

FIG. 13 illustrates an example of cluster control processing performed among three servers.

The following description assumes that the free spaces of the database server 100a, 100b, and 100 are 2 GB, 2.5 GB, and 3 GB, respectively. Thus, the priority levels of the database servers 100a, 100b and 100 are determined to be ranked first, second, and third, respectively. The database server 100a operates in the active state, and the database servers 100 and 100b operate in the standby state.

First, the database server 100 having the lowest priority level is selected as the defragmentation target. Through separation, initialization, replication, and incorporation, the total fragmentary free area of the database server 100 is reduced, and the free space is recovered to 5 GB. During the defragmentation, the free space of the database server 100a has dropped to 1.5 GB, and the free space of the database server 100b has dropped to 2 GB. After a database server is incorporated, since this database server has the largest free space, normally the priority levels have not changed at this point.

Next, the database server 100b having the lowest priority level between the databases on which the defragmentation has not been performed is selected as the defragmentation target. Since the database server 100b is temporarily separated from the cluster, the priority level of the database server 100 is increased and ranked second. Through separation, initialization, replication, and incorporation, the total fragmentary free area of the database server 100b is reduced, and the free space is recovered to 5 GB. During the defragmentation, the free space of the database server 100a has dropped to 1 GB, and the free space of the database server 100 has dropped to 4.5 GB. Thus, the priority level of the incorporated database server 100b is ranked third. As a result, the priority levels of the database servers 100, 100a, and 100b are maintained in ascending order of free space.

Finally, the database server 100a is selected as the defragmentation target. Since the database server 100a is in the active state, the database server 100a shifts to the standby state by a forcible failover. Consequently, the priority level of the database server 100 is increased and ranked first, and the priority level of the database server 100b is increased and ranked second. Through separation, initialization, replication, and incorporation, the total fragmentary free area of the database server 100a is reduced, and the free space is recovered to 5 GB. During the defragmentation, the free space of the database server 100 has dropped to 4 GB, and the free space of the database server 100b has dropped to 4.5 GB. Thus, the priority level of the incorporated database server 100a is ranked third. As a result, the priority levels of the database servers 100, 100a, and 100b are maintained in ascending order of free space. Thus, the priority levels are not changed.

As described above, the database servers 100, 100a, and 100b included in the cluster are assigned priority levels in ascending order of free space. The defragmentation is performed on the database servers 100, 100a, and 100b one by one, starting with the database server having the lowest priority level, namely, having the largest free space. In this way, the time in which a database server having a higher priority level has a larger free space than that of a database server having a lower priority level is shortened, and a risk of a failure of data synchronization due to a lack of free space is reduced.

In the above description, the management terminal 34 transmits the separate command, the initialize command, and the incorporate command. These commands may be transmitted one by one based on an individual input operation from the administrator or may be transmitted continuously in accordance with a program. Alternatively, the management terminal 34 may determine a predetermined event and start to transmit these commands automatically. Still alternatively, the database servers 100, 100a, and 100b may detect a predetermined event and automatically start defragmentation.

For example, for each of the plurality of databases included in the cluster, a free ratio, which is the ratio of the free space with respect to the total capacity of the data storage area, may be calculated. In this case, when the minimum free ratio falls below a threshold (for example, less than 10%), the defragmentation may be started. In addition, for each of the plurality of databases included in the cluster, a use ratio, which is the ratio of the use amount with respect to the total capacity of the data storage area, may be calculated. In this case, when the maximum use ratio exceeds a threshold (for example, 90%), the defragmentation may be started.

In the above description, the defragmentation is continuously performed on all the database servers included in the cluster. The failover command for switching the defragmentation target may be transmitted based on an input operation from the administrator. Alternatively, the failover command may be transmitted automatically in accordance with a program upon completion of the defragmentation on the previous defragmentation target. Alternatively, whether to perform the defragmentation on the second and subsequent database servers may be determined by the administrator.

In addition, the management terminal 34 may determine whether a predetermined continuation condition is satisfied and automatically transmit the failover command. Alternatively, the database servers 100, 100a, and 100b detect a predetermined continuation condition and automatically continue the defragmentation. For example, when there is a database server whose free ratio is less than a threshold or whose use ratio is over a threshold, the defragmentation may be continued.

Next, functions of the database servers 100, 100a, and 100b will be described. Hereinafter, the database server 100 will be described as a representative example. The database servers 100a and 100b have the same functions as those of the database server 100.

Figure 14:
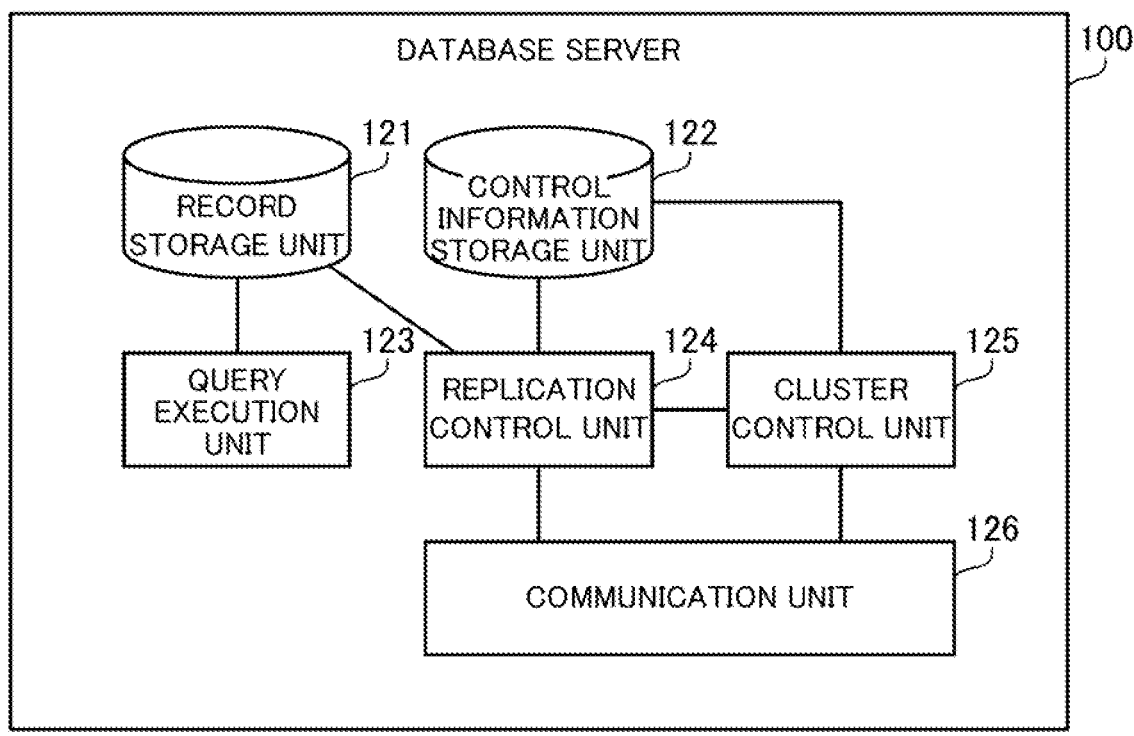
FIG. 14 is a block diagram illustrating a functional example of a database server.

FIG. 14 is a block diagram illustrating a functional example of the database server 100.

The database server 100 includes a record storage unit 121, a control information storage unit 122, a query execution unit 123, a replication control unit 124, a cluster control unit 125, and a communication unit 126. The record storage unit 121 and the control information storage unit 122 are each realized by using a storage area of the RAM 102. The query execution unit 123, the replication control unit 124, the cluster control unit 125, and the communication unit 126 are each realized by using a program.

The record storage unit 121 holds database records. The total capacity of the record storage unit 121 is previously determined, and it is preferable that the database servers 100, 100a, and 100b have the same total capacity. For example, a single record corresponds to a single row (tuple) in a table of a relational database and includes a plurality of columns. The structure of the record will be described below. The control information storage unit 122 holds control information used for controlling the cluster and managing the records. The control information will be described below in detail.

When the database server 100 operates in the active state, the query execution unit 123 receives a query such as in SQL from the application server 33, executes a record operation on the record storage unit 121 based on the query, and transmits an execution result. In response to a search query, the query execution unit 123 reads a record matching a search condition from the record storage unit 121. In response to an insert query, the query execution unit 123 inserts a new record into the record storage unit 121. In response to an update query, the query execution unit 123 rewrites a certain record in the record storage unit 121. In response to a delete query, the query execution unit 123 deletes a certain record in the record storage unit 121.

The replication control unit 124 realizes the data synchronization between database servers. When the database server 100 is in the active state, after a query is executed, the replication control unit 124 transmits a difference in the record storage unit 121 to another database server. When the database server 100 is in the standby state, the replication control unit 124 receives a difference from another database server and updates the record storage unit 121.

In addition, when the database server 100 is in the active state and incorporates a certain database server into the cluster, the replication control unit 124 sorts the records in the record storage unit 121 according to logical number and copies the sorted records to the database server that is to be incorporated. In addition, when the database server 100 is incorporated into the cluster, the replication control unit 124 receives all the records from another database server and tightly writes the received records in the record storage unit 121 so that as few fragmentary free areas as possible are created.

The cluster control unit 125 determines the role of the database server 100 in the cluster and controls the behavior of the database server 100. The cluster control unit 125 regularly exchanges heartbeat messages with other database servers and records information about the free spaces included in the heartbeat messages in the control information storage unit 122. The cluster control unit 125 determines the priority level of the database server 100 based on the free spaces.

In addition, if there is a database server that has not transmitted a heartbeat message, the cluster control unit 125 determines this database server to be defective and changes the priority level of the database server 100. In addition, the cluster control unit 125 changes the priority level of the database server 100 based on a failover command. The cluster control unit 125 changes the state of the database server 100 between the active state and the standby state based on the priority levels. In addition, the cluster control unit 125 controls the separation from and the incorporation into the cluster.

The communication unit 126 communicates with the management terminal 34 and the database servers 100a and 100b for managing cluster operations. The communication unit 126 receives various kinds of commands from the management terminal 34. In addition, the communication unit 126 receives heartbeat messages from the database servers 100*a* and 100*b* and transmits heartbeat messages to the database servers 100*a* and 100*b*. In addition, the communication unit 126 receives records from the database servers 100*a* and 100*b* and transmits records to the database servers 100*a* and 100*b*.

FIG. 15 illustrates a structural example of a record.

A record 131 is stored in the record storage unit 121. The record 131 includes a header and a body. The header includes a record length, a division flag, and an address. The record length is the size of the record 131. The division flag is a flag indicating whether the header and the body are separated from each other on the storage area. When the division flag indicates OFF, the header and the body are continuously stored. When the division flag indicates ON, the header and the body are separately stored. The address is a physical address indicating the initial location of the body on the storage area. When the division flag indicates OFF, the address may be omitted from the header. The body includes data. A plurality of column values are listed in the data.

FIG. 16 illustrates a structural example of a heartbeat message.

A heartbeat message 132 is transmitted among the database servers 100, 100*a*, and 100*b*. The heartbeat message 132 includes a kind, a message length, a transmission source server, and a free space. The kind indicates that the message kind of the heartbeat message 132 is a heartbeat. The message length is the size of the heartbeat message 132. The transmission source server indicates identification information of the database server that has transmitted this heartbeat message 132. The free space is the free space of the database calculated by the transmission source server.

Figure 17:
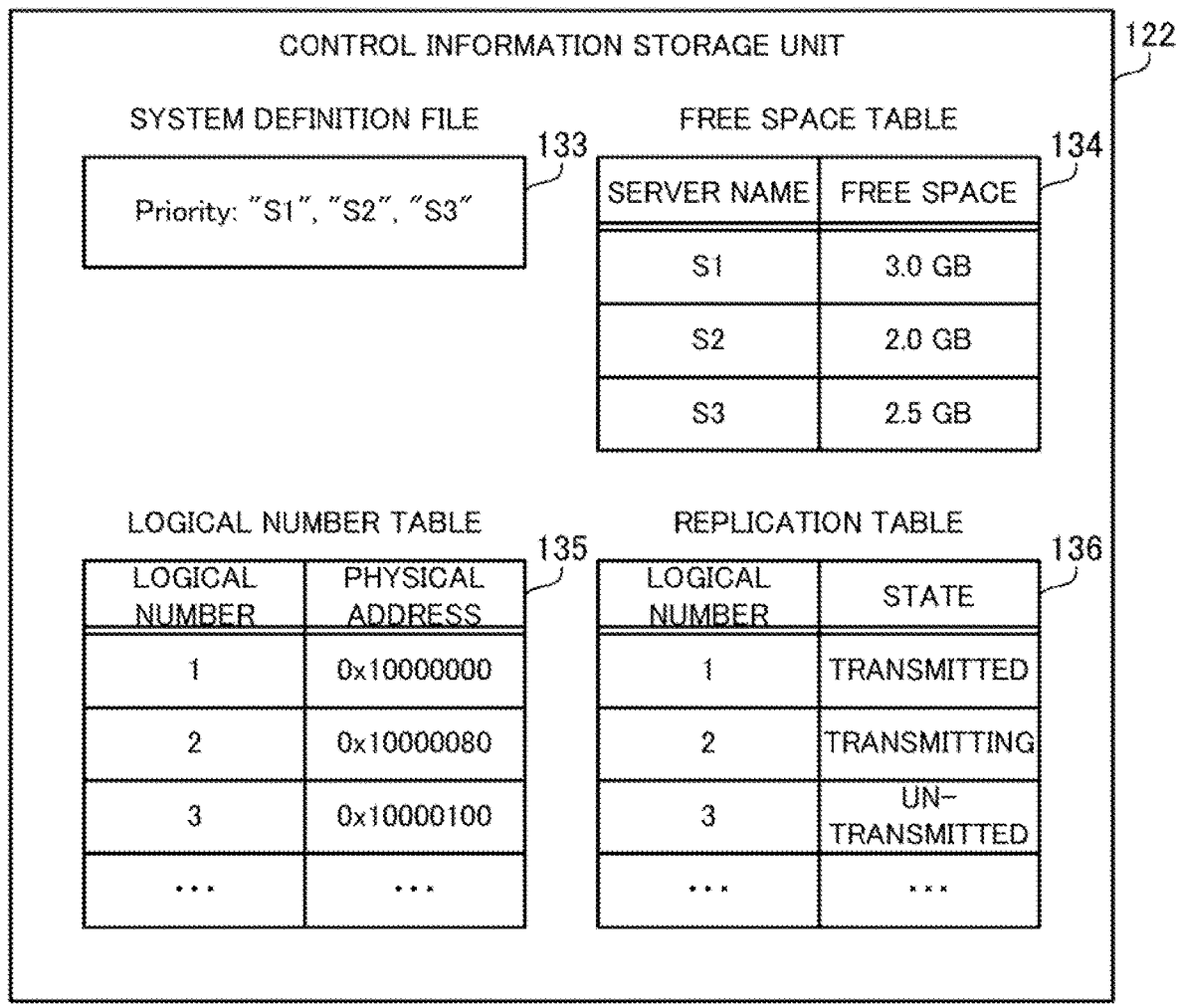
FIG. 17 illustrates a structural example of control information.

FIG. 17 illustrates a structural example of control information.

A system definition file 133 is stored in the control information storage unit 122. The system definition file 133 is created by the administrator. The system definition file 133 indicates the initial priority levels of the database servers 100, 100*a*, and 100*b*. For example, the identification information of the database servers 100, 100*a*, and 100*b* is listed in descending order of priority level. However, according to the second embodiment, the priority levels are automatically changed based on the free spaces.

A free space table 134 is stored in the control information storage unit 122. A server name and a free space are associated with each other in the free space table 134. In the free space table 134, the identification information of the database servers 100, 100*a*, and 100*b* is registered, and the free spaces of the individual databases are registered in association with their respective identification information. The database servers 100, 100*a*, and 100*b* have been notified of each other's free spaces by heartbeat messages. For example, information indicating that the free spaces of the database servers 100, 100*a*, and 100*b* are 3 GB, 2 GB, and 2.5 GB, respectively, is registered in the free space table 134.

A logical number table 135 is stored in the control information storage unit 122. A logical number and a physical address of a record are associated with each other in the logical number table 135. In the logical number table 135, the logical numbers of the records stored in the record storage unit 121 are registered, and the physical addresses indicating the initial locations of the records on the storage area are registered in association with the respective logical numbers. When the header and the body of a record are separated from each other, the physical address indicates the initial location of the header. The individual logical number is a non-negative integer identifier assigned to each of a plurality of records in such a manner that there are no overlaps, for example.

A replication table 136 is stored in the control information storage unit 122. The replication table 136 is generated at the time of replication in which all the records are transmitted in order of logical number. The replication table 136 is used for controlling the replication. The logical number and the state of a record are associated with each other in the replication table 136. In the replication table 136, the logical numbers of the records are registered, and the transmission states of the records are registered in association with the respective logical numbers. The individual record has one of the following transmission states: "untransmitted", "transmitting", and "transmitted". The initial transmission state is "untransmitted". The transmission states of the records shift from "untransmitted" to "transmitting" and from "transmitting" to "transmitted" in ascending order of logical number. If the transmission states of all the records have set to "transmitted", the replication is ended.

Next, a processing procedure of the database servers 100, 100*a*, and 100*b* will be described. The database server 100 will be described as a representative example. The database servers 100*a* and 100*b* perform the same processing procedure as that of the database server 100.

Figure 18:
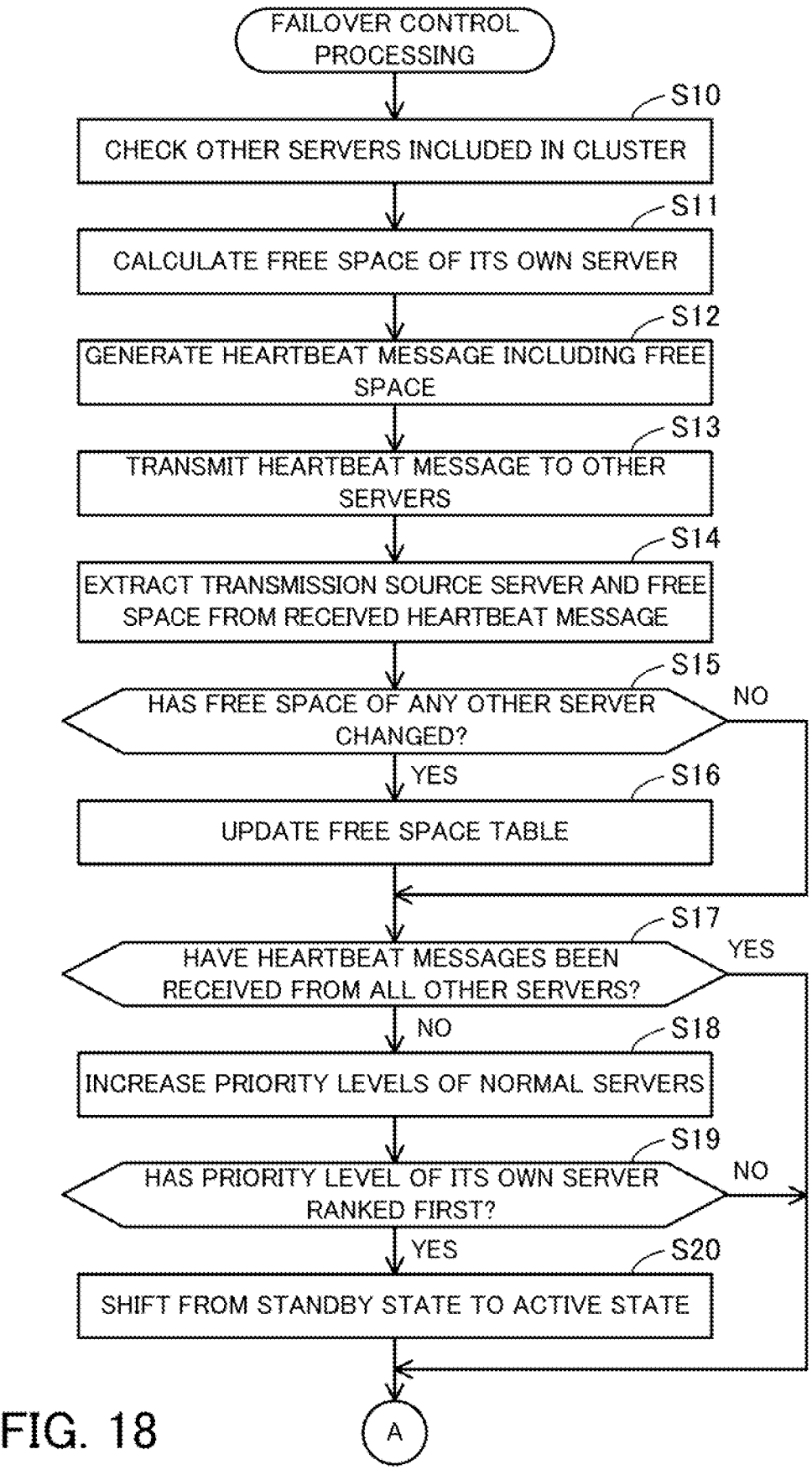
FIG. 18 is a first flowchart illustrating an example of a procedure of failover control processing.

FIG. 18 is a first flowchart illustrating an example of a procedure of failover control processing.

The failover control processing is performed in a predetermined cycle (for example, every three seconds).

(S10) The cluster control unit 125 checks the other database servers (for example, the database servers 100*a* and 100D) currently included in the cluster.

(S11) The cluster control unit 125 calculates the free space of the database of the database server 100. The size of the total fragmentary free area is not included in the free space. The free space of the database is the sum of the free spaces of the individual blocks.

(S12) The cluster control unit 125 generates a heartbeat message including information about the free space calculated in step S11 and the identification information of the database server 100.

(S13) The communication unit 126 transmits the heartbeat message generated in step S12 to the other database servers checked in step S10.

(S14) There are cases in which the communication unit 126 receives heartbeat messages from the other database servers. If the communication unit 126 has received a heartbeat message, the cluster control unit 125 extracts the identification information of the transmission source server and the information about the free space from the received heartbeat message.

(S15) The cluster control unit 125 searches the free space table 134 for the free space corresponding to the identification information extracted in step S14 and compares the retrieved free space with the information about the free space extracted in step S14 to determine whether the free space has changed. If the free space has changed, the processing proceeds to step S16. If not, the processing proceeds to step S17.

(S16) The cluster control unit 125 replaces the free space of the free space table 134 by the free space indicated by the heartbeat message, to update the free space table 134.

(S17) The cluster control unit 125 determines whether heartbeat messages have been received from all the other database servers checked in step S10. If the heartbeat messages have been received, the processing proceeds to step S21. If not, the processing proceeds to step S18.

(S18) The cluster control unit 125 determines those databases that have not transmitted a heartbeat message to be defective. The cluster control unit 125 increases the priority levels of the normal database servers other than those defective database servers. The database server 100 itself is included in the normal database servers.

(S19) The cluster control unit 125 determines whether the change of the priority levels has increased the priority level of the database server 100 from the second rank or lower to the first rank. If the priority level of the database server 100 has ranked first, the processing proceeds to step S20. If not, the processing proceeds to step S21.

(S20) The cluster control unit 125 shifts the state of the database server 100 from the standby state to the active state. After shifting to the active state, the database server 100 starts receiving queries from the application server 33.

Figure 19:
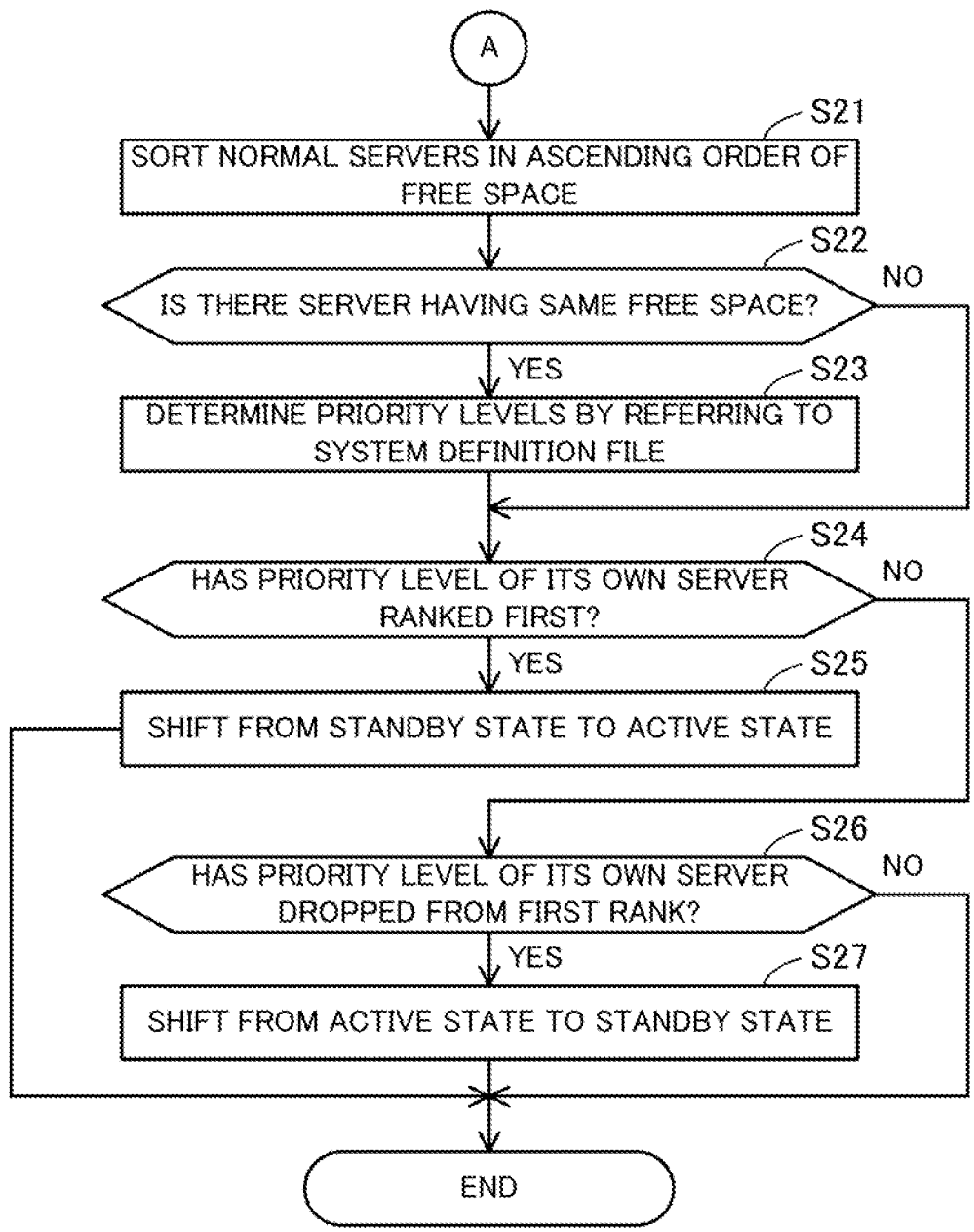
FIG. 19 is a second flowchart illustrating the example of the procedure of the failover control processing.
Figure 20:
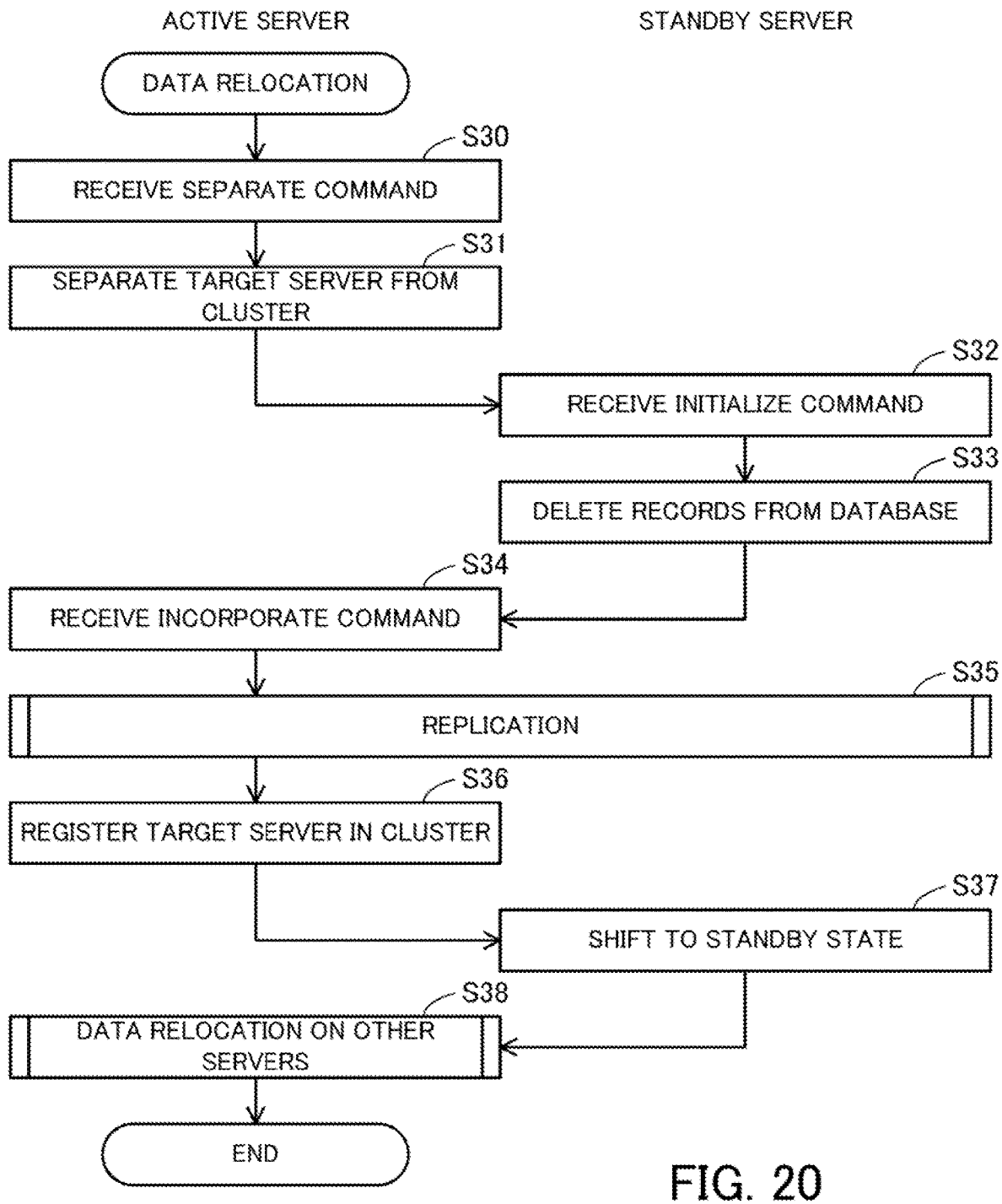
FIG. 20 is a flowchart illustrating an example of a procedure of data relocation.

FIG. 19 is a second flowchart illustrating the example of the procedure of the failover control processing.

(S21) The cluster control unit 125 refers to the free space table 134 and sorts the normal database servers in ascending order of free space.

(S22) The cluster control unit 125 determines whether there is a database server having the same free space. If there is a database server having the same free space, the processing proceeds to step S23. If not, the processing proceeds to step S24. The cluster control unit 125 determines the priority levels of the database servers having different free spaces so that a database server having a smaller free space has a higher priority level.

(S23) The cluster control unit 125 sets the priority levels of the database servers having the same free space so that these priority levels match those written in the system definition file 133.

(S24) The cluster control unit 125 determines whether the priority level of the database server 100 has increased from the second rank or lower to the first rank. If so, the processing proceeds to step S25. If not, the processing proceeds to step S26.

(S25) The cluster control unit 125 shifts the state of the database server 100 from the standby state to the active state and ends the failover control processing.

(S26) The cluster control unit 125 determines whether the priority level of the database server 100 has dropped from the first rank to the second rank or lower. If so, the processing proceeds to step S27. If not, the cluster control unit 125 ends the failover control processing.

(S27) The cluster control unit 125 shifts the state of the database server 100 from the active state to the standby state.

PEG. 20 is a flowchart illustrating an example of a procedure of data relocation.

The following description assumes that the database server 100*a* is in the active state and that the database server 100 is in the standby state and is a data relocation target.

(S30) The database server 100*a* receives a separate command.

(S31) The database server 100*a* separates the database server 100 specified by the separate command from the cluster. The database server 100*a* suspends the data synchronization with the database server 100 and suspends the exchange of heartbeat messages with the database server 100 for alive check.

(S32) The database server 100 receives an initialize command.

(S33) The database server 100 initializes its database and deletes all the records stored in its RAM 102.

(S34) The database server 100*a* receives an incorporate command.

(S35) The database server 100*a* performs replication in which the database server 100*a* copies all the records to the database server 100 specified by the incorporate command. This replication control processing will be described in detail below.

(S36) The database server 100*a* registers the database server 100 specified by the incorporate command in the cluster. The database server 100*a* resumes the exchange of heartbeat messages with the database server 100 for alive check and resumes the data synchronization with the database server 100.

(S37) The database server 100 shifts to the standby state. The database server 100*a* may instruct the database server 100 to shift its state.

(S38) The above steps S30 to S37 are performed on the database servers other than the database server 100 as the data relocation targets. For example, the database server in the active state is changed by a failover command.

Figure 21:
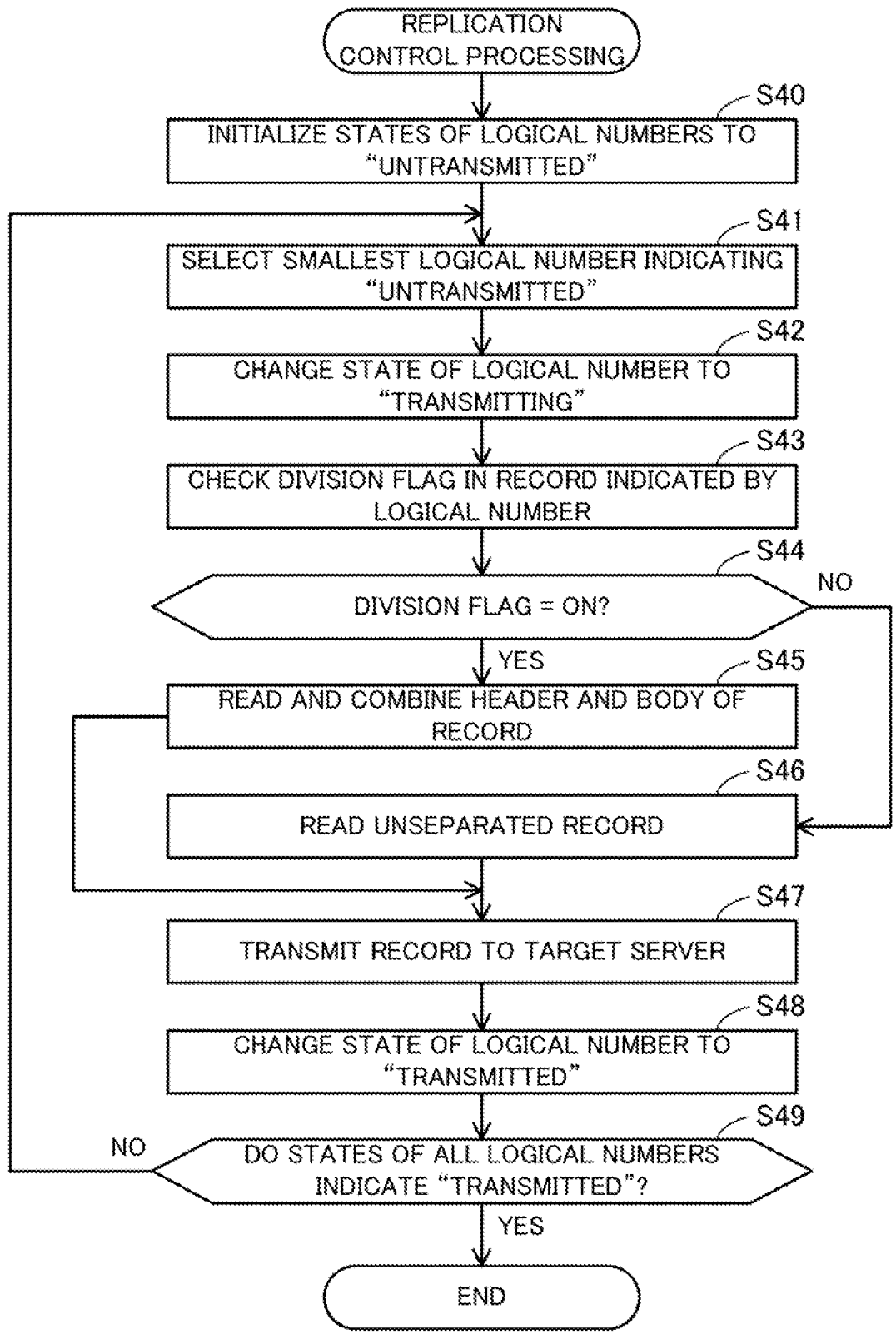
FIG. 21 is a flowchart illustrating an example of a procedure of replication control processing.

FIG. 21 is a flowchart illustrating an example of a procedure of replication control processing.

This replication control processing corresponds to the above step S35.

(S40) The replication control unit 124 refers to the logical number table 135 to check the logical numbers of the existing records. The replication control unit 124 generates the replication table 136 in which the logical numbers are listed and initializes the states corresponding to the logical numbers to "untransmitted".

(S41) The replication control unit 124 selects the smallest logical number whose state indicates "untransmitted" from the replication table 136.

(S42) The replication control unit 124 changes the state corresponding to the logical number selected in step S41 to "transmitting" in the replication table 136.

(S43) The replication control unit 124 refers to the logical number table 135, tracks the physical address corresponding to the logical number selected in step S41, accesses the corresponding record, and checks the division flag included in the header of the record.

(S44) The replication control unit 124 determines whether the division flag checked in step S43 is ON. If the division flag is ON, the processing proceeds to step S45. If the division flag is OFF, the processing proceeds to step S46.

(S45) The replication control unit 124 reads the header by tracking the physical address in the logical number table 135. In addition, the replication control unit 124 reads the body by tracking the physical address included in the header. The replication control unit 124 combines the header and the body to reproduce an unseparated record. Next, the processing proceeds to step S47.

(S46) The replication control unit 124 reads the unseparated record by tracking the physical address in the logical number table 135.

(S47) The communication unit 126 transmits the record in step S45 or S46 to the database server that is to be incorporated in the cluster.

(S48) The replication control unit 124 changes the state corresponding to the logical number selected in step S41 to "transmitted" in the replication table 136.

(S49) The replication control unit 124 determines whether the states of all the logical numbers in the replication table 136 indicate "transmitted". If the states of all the logical numbers indicate "transmitted", the replication control unit 124 ends the replication control processing. If there is a logical number whose state indicate "untransmitted", the processing returns to step S41.

In the information processing system according to the second embodiment, database redundancy is achieved by using a plurality of database servers. Thus, the fault tolerance of the databases is improved. In addition, relocation of the records reduces the total fragmentary free area and recovers the free space. Thus, even in an online system that operates non-disruptively for a long time, a lack of capacity due to fragmentation does not occur. In addition, by sequentially performing separation, initialization, replication, and incorporation on the plurality of database servers, fragmentation is resolved. Therefore, deterioration of the query execution rate of the active-state database server is prevented.

In addition, the free spaces of the plurality of database servers are monitored, and the active state and the standby state are switched so that the active-state database server has a smaller free space and the standby-state database server has a larger free space. Thus, the risk of a data synchronization failure that occurs due to a lack of capacity of a standby-state database server after the active-state database server succeeds in a commit is reduced. As a result, the data redundancy is maintained. In addition, in replication, the plurality of records are sorted in order of logical number, and the portions of a record are combined. Therefore, record search is performed at high speed on a database server on which relocation has been performed.

In one aspect, data relocation in a plurality of databases is smoothly performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store items of free space information in association with a plurality of respective databases including same data, the items of free space information indicating free spaces that depend on fragmentation states of storage areas in which the same data is stored; and
a processor configured to execute a process including:
determining, among the plurality of databases, a first database to perform a role of an active database and a second database having a free space larger than that of the first database to perform a role of a standby database, based on the items of free space information,
performing data relocation processing on the second database, the data relocation processing including suspending data synchronization in which updating of the active database is reflected on the standby database, initializing the standby database, copying data of the active database to the standby database, and resuming the data synchronization, and
controlling the data relocation processing such that the data relocation processing is performed on a database other than the second database by switching the role of the active database and the role of the standby database among the plurality of databases.

2. The information processing apparatus according to claim 1, wherein a plurality of nodes corresponding to the plurality of databases continuously exchange heartbeat messages indicating that the plurality of nodes are performing a normal operation, and the free spaces are monitored by inserting the items of free space information into the heartbeat messages.

3. The information processing apparatus according to claim 1, wherein the first database is a database having a smallest free space among the plurality of databases, and the second database is a database having a largest free space among the plurality of databases.

4. The information processing apparatus according to claim 3, wherein
the plurality of databases includes a third database having a free space larger than that of the first database and smaller than that of the second database, and
the processor determines the third database to perform the role of the standby database and controls the data relocation processing such that the data relocation processing is performed on the third database preferentially over the first database.

5. The information processing apparatus according to claim 1, wherein
the data of the active database includes a plurality of records, and
in the data relocation processing, the plurality of records are copied such that a plurality of records dispersedly stored in discontinuous storage areas in the active database are stored in continuous storage areas in the standby database.

6. The information processing apparatus according to claim 1, wherein, when the free space of the first database falls below a threshold, the processor starts the data relocation processing on the second database.

7. An information processing system comprising:
a first information processing apparatus including
a first database among a plurality of databases including same data, and
a first processor configured to monitor free spaces of the plurality of databases, the free spaces depending on fragmentation states of storage areas in which the same data is stored;
a second information processing apparatus including
a second database among the plurality of databases, and
a second processor,
when the free space of the second database is larger than that of the first database, the first information processing apparatus determines the first database to perform a role of an active database and the second database to perform a role of a standby database,
the first information processing apparatus performs data relocation processing on the second database, the data relocation processing including suspending data synchronization in which updating of the active database is reflected on the standby database, initializing the standby database, copying data of the active database to the standby database, and resuming the data synchronization, and
the second information processing apparatus performs the data relocation processing on the first database by switching the role of the active database and the role of the standby database among the plurality of databases.

8. The information processing system according to claim 7, wherein the first information processing apparatus and the second information processing apparatus continuously exchange heartbeat messages indicating that the first information processing apparatus and the second information processing apparatus are performing a normal operation, and the free spaces are monitored by inserting items of information about the free spaces into the heartbeat messages.

9. The information processing system according to claim 7, wherein, when the first database is a database having a smallest free space among the plurality of databases and the second database is a database having a largest free space among the plurality of databases, the first information processing apparatus performs the data relocation processing on the second database.

10. The information processing system according to claim 9, further comprising:
 a third information processing apparatus including a third database having a free space larger than that of the first database and smaller than that of the second database,
 wherein, after performing the data relocation processing on the second database, the first information processing apparatus performs the data relocation processing on the third database before performing the data relocation processing on the first database.

11. A non-transitory computer-readable recording medium storing therein a computer program that causes a computer to execute a process comprising:
 monitoring free spaces of a plurality of databases including same data, the free spaces depending on fragmentation states of storage areas in which the same data is stored;
 determining, among the plurality of databases, a first database to perform a role of an active database and a second database having a free space larger than that of the first database to perform a role of a standby database, based on the free spaces,
 performing data relocation processing on the second database, the data relocation processing including suspending data synchronization in which updating of the active database is reflected on the standby database, initializing the standby database, copying data of the active database to the standby database, and resuming the data synchronization, and
 controlling the data relocation processing such that the data relocation processing is performed on a database other than the second database by switching the role of the active database and the role of the standby database among the plurality of databases.

12. The non-transitory computer-readable recording medium according to claim 11, wherein a plurality of nodes corresponding to the plurality of databases continuously exchange heartbeat messages indicating that the plurality of nodes are performing a normal operation, and the free spaces of the plurality of nodes are monitored by inserting information about the free spaces into the heartbeat messages.

13. The non-transitory computer-readable recording medium according to claim 11, wherein the first database is a database having a smallest free space among the plurality of databases, and the second database is a database having a largest free space among the plurality of databases.

14. The non-transitory computer-readable recording medium according to claim 13, wherein
 the plurality of databases includes a third database having a free space larger than that of the first database and smaller than that of the second database, and
 the controlling of the data relation processing includes determining the third database to perform the role of the standby database such that the data relocation processing is performed on the third database preferentially over the first database.

* * * * *